US012160377B2

(12) United States Patent
Zhu et al.

(10) Patent No.: US 12,160,377 B2
(45) Date of Patent: Dec. 3, 2024

(54) MINIMIZATION OF DRIVE TEST FOR DUAL CONNECTIVITY

(71) Applicant: Qualcomm Incorporated, San Diego, CA (US)

(72) Inventors: Xipeng Zhu, San Diego, CA (US); Huichun Liu, Beijing (CN); Gavin Bernard Horn, La Jolla, CA (US); Peng Cheng, Beijing (CN); Juan Zhang, Beijing (CN); Tom Chin, San Diego, CA (US); Min Wang, San Diego, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 293 days.

(21) Appl. No.: 17/424,446

(22) PCT Filed: Jan. 22, 2020

(86) PCT No.: PCT/CN2020/073685
§ 371 (c)(1),
(2) Date: Jul. 20, 2021

(87) PCT Pub. No.: WO2020/151731
PCT Pub. Date: Jul. 30, 2020

(65) Prior Publication Data
US 2022/0158781 A1    May 19, 2022

(30) Foreign Application Priority Data

Jan. 24, 2019    (WO) ................ PCT/CN2019/072924

(51) Int. Cl.
*H04L 5/00* (2006.01)
*H04W 24/10* (2009.01)
(Continued)

(52) U.S. Cl.
CPC .......... *H04L 5/0032* (2013.01); *H04W 24/10* (2013.01); *H04W 28/0252* (2013.01); *H04W 84/042* (2013.01); *H04W 88/06* (2013.01)

(58) Field of Classification Search
CPC .. H04L 5/0032; H04W 24/10; H04W 28/0252
(Continued)

(56) References Cited

U.S. PATENT DOCUMENTS

2012/0106370 A1*    5/2012    Radulescu ............ H04W 24/10
                                                                  370/252
2013/0072182 A1    3/2013    Jung et al.
(Continued)

FOREIGN PATENT DOCUMENTS

EP    2922334 A1    9/2015
EP    3846527 A1    7/2021
(Continued)

OTHER PUBLICATIONS

Samsung: "Use case for Minimization of Drive Testing", R3-186104, 3GPP TSG-RAN WG3 #101bis, Chengdu, China, Oct. 8-12, 2018, 4 Pages, Oct. 16, 2018.
(Continued)

*Primary Examiner* — Ted M Wang
(74) *Attorney, Agent, or Firm* — Holland & Hart LLP

(57)    ABSTRACT

Methods, systems, and devices for wireless communications are described. A user equipment (UE) may identify that the UE is operating in a dual-connectivity configuration with a master node (MN) and a secondary node (SN). The UE may receive at least one request that the UE report MDT measurements. The UE may perform a first portion of measurements associated with the first base station and perform a second portion of measurements associated with the second base station. The UE may perform the measurements while the UE is operating in the dual-connectivity configuration.
(Continued)

The UE may transmit one or more reports including information indicative of the first portion of measurements, information indicative of the second portion of measurements, or both.

28 Claims, 15 Drawing Sheets

(51) Int. Cl.
*H04W 28/02* (2009.01)
*H04W 84/04* (2009.01)
*H04W 88/06* (2009.01)

(58) Field of Classification Search
USPC ...................................................... 455/452.1
See application file for complete search history.

(56) References Cited

U.S. PATENT DOCUMENTS

| | | | |
|---|---|---|---|
| 2015/0131578 A1 | 5/2015 | Baek et al. | |
| 2015/0334551 A1 | 11/2015 | Aminaka et al. | |
| 2016/0081020 A1* | 3/2016 | Rahman | H04W 24/10 370/311 |
| 2016/0249259 A1 | 8/2016 | Park et al. | |
| 2017/0094676 A1* | 3/2017 | Kim | H04W 72/12 |
| 2017/0208491 A1 | 7/2017 | Xu et al. | |
| 2017/0318505 A1 | 11/2017 | Park et al. | |
| 2018/0124648 A1* | 5/2018 | Park | H04W 36/22 |

FOREIGN PATENT DOCUMENTS

| | | |
|---|---|---|
| EP | 3910987 A1 | 11/2021 |
| WO | WO-2015113309 A1 | 8/2015 |
| WO | WO-2017220635 A1 | 12/2017 |

OTHER PUBLICATIONS

Huawei: "Support of MDT in NG-RAN", 3GPP TSG-RAN3 Meeting #101-bis, R3-186026, 3rd Generation Partnership Project, Mobile Competence Centre, 650, Route Des Lucioles, F-06921 Sophia-Antipolis Cedex, France, Sep. 29, 2018, Chengdu, China, Oct. 8-12, 2018, pp. 1-3, XP051529292, the whole document.
Supplementary European Search Report—EP20744291—Search Authority—Munich—dated Aug. 18, 2022.
ZTE: "Initial Consideration on RAN-Centric Data Collection and Utilization for LTE and NR", 3GPP TSG RAN WG3 NR#101bis, R3-185578, 3rd Generation Partnership Project, Mobile Competence Centre, 650, Route Des Lucioles, vol. RAN WG3, No. Chengdu, China, Oct. 8, 2018-Oct. 12, 2018, Oct. 7, 2018, 5 Pages, XP051528854, the whole document.
International Search Report and Written Opinion—PCT/CN2020/073685—ISA/EPO—dated Apr. 21, 2020.
International Search Report and Written Opinion—PCT/CN2019/072924—ISA/EPO—dated Oct. 30, 2019.

* cited by examiner

MINIMIZATION OF DRIVE TEST FOR DUAL CONNECTIVITY

CROSS REFERENCE TO RELATED APPLICATIONS

The present application for patent claims priority to International Patent Application No. PCT/CN2020/073685 by Zhu et al., entitled "MINIMIZING OF DRIVE TEST FOR DUAL CONNECTIVITY," filed Jan. 22, 2020; and to International Patent Application No. PCT/CN2019/072924 by Zhu et al., entitled "MINIMIZING OF DRIVE TEST FOR DUAL CONNECTIVITY," filed Jan. 24, 2019, each of which is assigned to the assignee hereof and each of which is hereby incorporated by reference in its entirety.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some systems use minimization of drive tests (MDTs) to optimize network performance and reduce or eliminate the need for drive tests (e.g., network tests in which a person drives a test vehicle to collect measurements). In an MDT, a UE may be used to perform various measurements associated with a connection to a base station, such as quality of service measurements.

In some wireless communications systems, a UE may communicate with two base stations in a dual-connectivity configuration. In this case, MDT measurements performed by a UE while connected with a single base station (e.g., in a single-connectivity configuration) may not accurately reflect network performance for a UE operating in a dual-connectivity configuration. Efficient techniques for performing MDTs in a dual-connectivity configuration are desired.

SUMMARY

The described techniques relate to improved methods, systems, devices, and apparatuses that support minimization of drive tests (MDTs) for dual connectivity. Generally, the described techniques enable MDTs to be performed in the context of a dual-connectivity configuration, in which a UE is concurrently connected with two base stations.

In some cases, a base station that is a master node (MN) of the dual-connectivity configuration may receive an MDT trace request from an external network entity, such as a network operator, and may then transmit, to a UE, a request for MDT measurements. The request may include measurement configuration information for the MN. The MN may also send a trace request to a base station that is a secondary node (SN) in the dual-connectivity configuration. The SN may, after receiving the trace request from the MN, transmit its own request for MDT measurements, which may include measurement configuration information for the SN. The SN may transmit its request directly to the UE, or may transmit its request to the MN. In the latter case, the MN may include the measurement configuration information for the SN in the MN's request to report MDT measurements.

In some cases, the radio access technology (RAT) associated with the MN may be the same as or different than the RAT associated with the SN. For example, the MN and SN may each be associated with a long-term evolution (LTE) RAT, a new radio (NR) RAT, or another RAT. In some cases, the measurement configuration information may include information related to the RAT associated with the MN and/or the SN. In some cases, the measurement configuration information may include one or more fields indicating one or more RATs that may be used by the UE for performing the MDT measurements, and/or indicating one or more RATs that may be used by the UE or by a base station for transmitting the resulting report(s).

Thus, in some cases, the UE may receive a single request to report MDT measurements from the MN or may receive separate requests from the MN and SN. In response to receiving the request(s), the UE may perform measurements associated with the MN and measurements associated with the SN while operating in the dual-connectivity configuration.

After performing the MDT measurements, the UE may transmit a report to the MN with information indicative of the results of the measurements associated with the MN, and may transmit a report to the SN with information indicative of the results of the measurements associated with the SN. Alternatively, the UE may transmit a single report to the MN that includes information indicative of the measurements associated with both the MN and the SN.

A method of wireless communications at a UE is described. The method may include identifying that the UE is operating in a dual-connectivity configuration including a first base station and a second base station, receiving at least one request for MDT measurements, performing, based on the at least one request, a first portion of measurements associated with the first base station while the UE is operating in the dual-connectivity configuration, performing, based on the at least one request, a second portion of measurements associated with the second base station while the UE is operating in the dual-connectivity configuration, and transmitting one or more reports including information indicative of the first portion of measurements, information indicative of the second portion of measurements, or both.

An apparatus for wireless communications at a UE is described. The apparatus may include a processor, memory coupled with the processor, and instructions stored in the memory. The instructions may be executable by the processor to cause the apparatus to identify that the UE is operating in a dual-connectivity configuration including a first base station and a second base station, receive at least one request for MDT measurements, perform, based on the at least one request, a first portion of measurements associated with the first base station while the UE is operating in the dual-connectivity configuration, perform, based on the at least one request, a second portion of measurements associated with the second base station while the UE is operating in the dual-connectivity configuration, and transmit one or more reports including information indicative of the first portion of measurements, information indicative of the second portion of measurements, or both.

Another apparatus for wireless communications at a UE is described. The apparatus may include means for identifying that the UE is operating in a dual-connectivity configuration including a first base station and a second base station, receiving at least one request for MDT measurements, performing, based on the at least one request, a first portion of measurements associated with the first base station while the UE is operating in the dual-connectivity configuration, performing, based on the at least one request, a second portion of measurements associated with the second base station while the UE is operating in the dual-connectivity configuration, and transmitting one or more reports including information indicative of the first portion of measurements, information indicative of the second portion of measurements, or both.

A non-transitory computer-readable medium storing code for wireless communications at a UE is described. The code may include instructions executable by a processor to identify that the UE is operating in a dual-connectivity configuration including a first base station and a second base station, receive at least one request for MDT measurements, perform, based on the at least one request, a first portion of measurements associated with the first base station while the UE is operating in the dual-connectivity configuration, perform, based on the at least one request, a second portion of measurements associated with the second base station while the UE is operating in the dual-connectivity configuration, and transmit one or more reports including information indicative of the first portion of measurements, information indicative of the second portion of measurements, or both.

In some examples of the method, apparatuses, and non-transitory computer-readable medium described herein, transmitting one or more reports may include operations, features, means, or instructions for transmitting, to the first base station, a first report including information indicative of the first portion of measurements, and transmitting, to the second base station, a second report including information indicative of the second portion of measurements.

In some examples of the method, apparatuses, and non-transitory computer-readable medium described herein, transmitting one or more reports may include operations, features, means, or instructions for transmitting, to the first base station, a first report that includes information indicative of both the first portion of measurements and the second portion of measurements.

In some examples of the method, apparatuses, and non-transitory computer-readable medium described herein, receiving the at least one request for MDT measurements may include operations, features, means, or instructions for receiving, from the first base station, a first measurement configuration for the first portion of measurements, and receiving, from the second base station, a second measurement configuration for the second portion of measurements.

In some examples of the method, apparatuses, and non-transitory computer-readable medium described herein, receiving the second measurement configuration may include operations, features, means, or instructions for receiving the second measurement configuration from the second base station via direct signaling radio bearer SRB3.

In some examples of the method, apparatuses, and non-transitory computer-readable medium described herein, receiving the at least one request for MDT measurements may include operations, features, means, or instructions for receiving, from the first base station, a first measurement configuration for the first portion of measurements and a second measurement configuration for the second portion of measurements.

In some examples of the method, apparatuses, and non-transitory computer-readable medium described herein, the first base station may be a master node in the dual-connectivity configuration and the second base station may be a secondary node in the dual-connectivity configuration.

In some examples of the method, apparatuses, and non-transitory computer-readable medium described herein, the first portion of measurements may be performed concurrently with the second portion of measurements.

Some examples of the method, apparatuses, and non-transitory computer-readable medium described herein may further include operations, features, means, or instructions for storing results of the first portion of measurements and results of the second portion of measurements, and entering a radio resource control (RRC) connected mode after storing the results of the first portion of measurements and the results of the second portion of measurements, where the UE transmits the one or more reports while in the RRC connected mode.

A method of wireless communications at a first base station is described. The method may include identifying that the first base station is a master node for a UE operating in a dual-connectivity configuration, receiving a first MDT (minimization of drive test) trace request, transmitting a second MDT trace request to a second base station operating as a secondary node for the UE, the second MDT trace request being based on the first MDT trace request, and transmitting a request for one or more MDT measurements to be reported by the UE in accordance with at least the first MDT trace request.

An apparatus for wireless communications at a first base station is described. The apparatus may include a processor, memory coupled with the processor, and instructions stored in the memory. The instructions may be executable by the processor to cause the apparatus to identify that the first base station is a master node for a UE operating in a dual-connectivity configuration, receive a first MDT trace request, transmit a second MDT trace request to a second base station operating as a secondary node for the UE, the second MDT trace request being based on the first MDT trace request, and transmit a request for one or more MDT measurements to be reported by the UE in accordance with at least the first MDT trace request.

Another apparatus for wireless communications at a first base station is described. The apparatus may include means for identifying that the first base station is a master node for a UE operating in a dual-connectivity configuration, receiving a first MDT (minimization of drive test) trace request, transmitting a second MDT trace request to a second base station operating as a secondary node for the UE, the second MDT trace request being based on the first MDT trace request, and transmitting a request for one or more MDT measurements to be reported by the UE in accordance with at least the first MDT trace request.

A non-transitory computer-readable medium storing code for wireless communications at a first base station is described. The code may include instructions executable by a processor to identify that the first base station is a master node for a UE operating in a dual-connectivity configuration, receive a first MDT (minimization of drive test) trace request, transmit a second MDT trace request to a second base station operating as a secondary node for the UE, the second MDT trace request being based on the first MDT trace request, and transmit a request for one or more MDT measurements to be reported by the UE in accordance with at least the first MDT trace request.

In some examples of the method, apparatuses, and non-transitory computer-readable medium described herein, transmitting the request may include operations, features, means, or instructions for transmitting a first measurement configuration to the UE, the first measurement configuration associated with performing the one or more measurements on the first base station.

Some examples of the method, apparatuses, and non-transitory computer-readable medium described herein may further include operations, features, means, or instructions for receiving, from the second base station, a second measurement configuration associated with performing the one or more measurements on the second base station, where transmitting the request for one or more measurements includes transmitting the second measurement configuration to the UE.

Some examples of the method, apparatuses, and non-transitory computer-readable medium described herein may further include operations, features, means, or instructions for receiving, from the UE, a first report including information indicative of the one or more measurements performed on the first base station by the UE.

Some examples of the method, apparatuses, and non-transitory computer-readable medium described herein may further include operations, features, means, or instructions for transmitting a second report including at least a portion of the information indicative of the one or more measurements performed on the first base station to a network entity.

In some examples of the method, apparatuses, and non-transitory computer-readable medium described herein, the second MDT trace request includes an indication of the UE.

Some examples of the method, apparatuses, and non-transitory computer-readable medium described herein may further include operations, features, means, or instructions for receiving, from the second base station, a second report including information indicative of the one or more measurements performed on the second base station.

Some examples of the method, apparatuses, and non-transitory computer-readable medium described herein may further include operations, features, means, or instructions for combining the information indicative of the one or more measurements performed on the first base station with the information indicative of the one or more measurements performed on the second base station to generate information indicative of one or more overall measurements, and transmitting a third report including the information indicative of the one or more overall measurements to a network entity.

In some examples of the method, apparatuses, and non-transitory computer-readable medium described herein, the first MDT trace request includes an indication of the UE.

Some examples of the method, apparatuses, and non-transitory computer-readable medium described herein may further include operations, features, means, or instructions for selecting the UE from a set of UEs based on one or more of a user consent associated with the UE, a capability of the UE, an area associated with the UE, and a public land mobile network (PLMN) list associated with the UE.

A method of wireless communications at a first base station, the method including is described. The method may include identifying that the first base station is a secondary node for a UE operating in a dual-connectivity configuration, receiving, from a second base station that is a master node for the UE in the dual-connectivity configuration, a MDT trace request associated with the UE, and transmitting a request for one or more MDT measurements to be reported by the UE based on receipt of the MDT trace request from the master node.

An apparatus for wireless communications at a first base station, the method including is described. The apparatus may include a processor, memory coupled with the processor, and instructions stored in the memory. The instructions may be executable by the processor to cause the apparatus to identify that the first base station is a secondary node for a UE operating in a dual-connectivity configuration, receive, from a second base station that is a master node for the UE in the dual-connectivity configuration, a MDT (minimization of drive test) trace request associated with the UE, and transmit a request for one or more MDT measurements to be reported by the UE based on receipt of the MDT trace request from the master node.

Another apparatus for wireless communications at a first base station, the method including is described. The apparatus may include means for identifying that the first base station is a secondary node for a UE operating in a dual-connectivity configuration, receiving, from a second base station that is a master node for the UE in the dual-connectivity configuration, a MDT (minimization of drive test) trace request associated with the UE, and transmitting a request for one or more MDT measurements to be reported by the UE based on receipt of the MDT trace request from the master node.

A non-transitory computer-readable medium storing code for wireless communications at a first base station, the method including is described. The code may include instructions executable by a processor to identify that the first base station is a secondary node for a UE operating in a dual-connectivity configuration, receive, from a second base station that is a master node for the UE in the dual-connectivity configuration, a MDT (minimization of drive test) trace request associated with the UE, and transmit a request for one or more MDT measurements to be reported by the UE based on receipt of the MDT trace request from the master node.

In some examples of the method, apparatuses, and non-transitory computer-readable medium described herein, transmitting the request may include operations, features, means, or instructions for transmitting a measurement configuration to the second base station, the measurement configuration associated with performing the one or more MDT measurements on the first base station.

In some examples of the method, apparatuses, and non-transitory computer-readable medium described herein, transmitting the request may include operations, features, means, or instructions for transmitting a measurement configuration to the UE, the measurement configuration associated with performing the one or more MDT measurements on the first base station.

In some examples of the method, apparatuses, and non-transitory computer-readable medium described herein, the measurement configuration may be transmitted to the UE via RRC signaling.

Some examples of the method, apparatuses, and non-transitory computer-readable medium described herein may further include operations, features, means, or instructions for receiving, from the UE, a report including information indicative of the one or more MDT measurements performed by the UE.

Some examples of the method, apparatuses, and non-transitory computer-readable medium described herein may further include operations, features, means, or instructions for transmitting a second report to the second base station, the second report based on the report including the information indicative of the one or more MDT measurements.

Some examples of the method, apparatuses, and non-transitory computer-readable medium described herein may further include operations, features, means, or instructions for transmitting a second report to a network entity, the second report based on the report including the information indicative of the one or more MDT measurements.

In some examples of the method, apparatuses, and non-transitory computer-readable medium described herein, the MDT trace request includes an indication of the UE.

DETAILED DESCRIPTION

Figure 1:
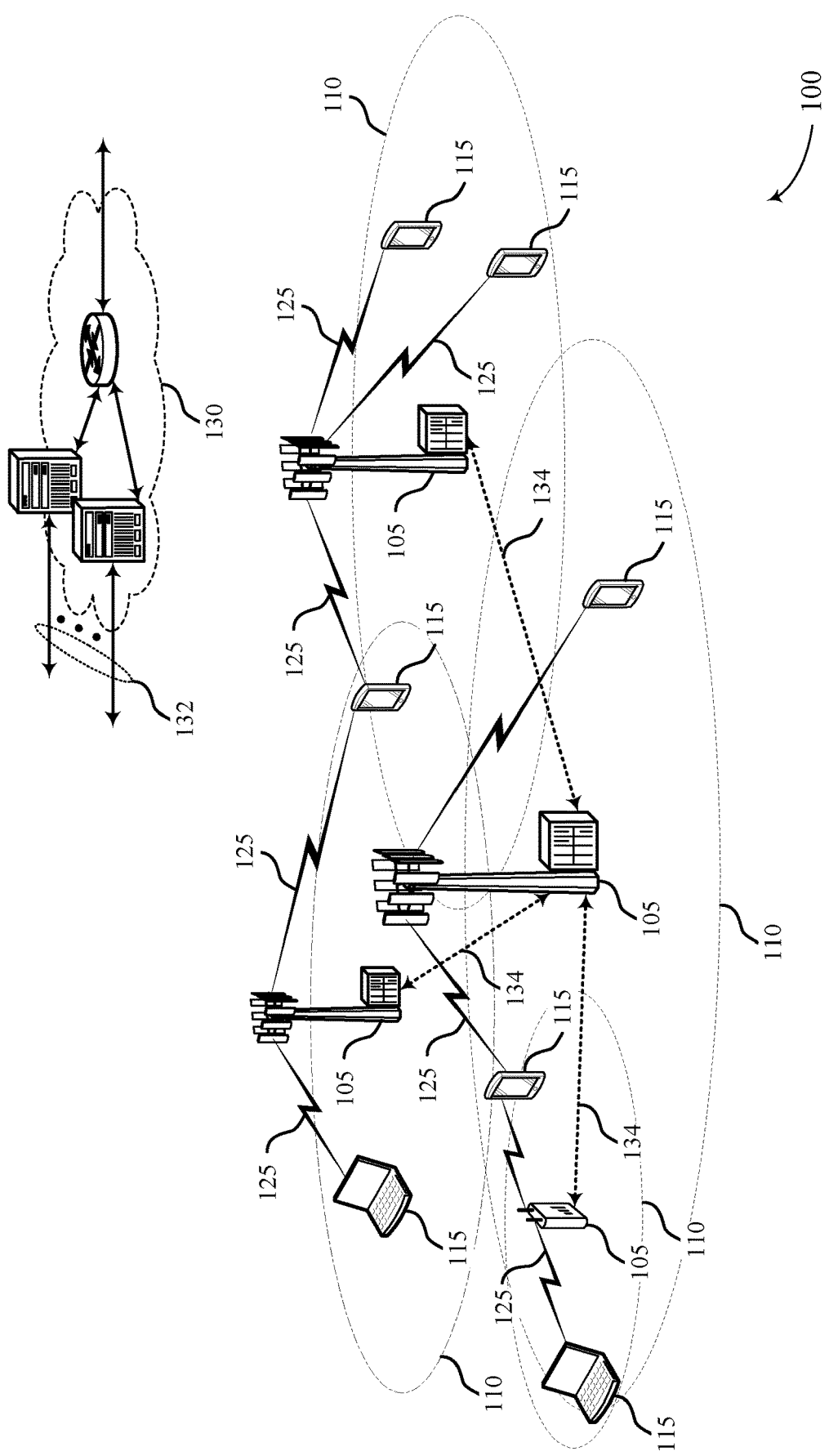
FIG. 1 illustrates an example of a system for wireless communications that supports minimization of drive tests for dual connectivity in accordance with aspects of the present disclosure.

Some networks rely on minimization of drive tests (MDTs) to evaluate and optimize network performance. A UE may perform an MDT by performing various MDT measurements associated with a base station, for example. MDT measurements may include quality of service measurements, such as throughput and latency, or other types of measurements.

In some wireless communications systems, a UE may be simultaneously connected with a first base station and a second base station (e.g., in a dual-connectivity configuration), and may consume resources allocated by both base stations. The first and second base stations may be referred to as a master node (MN) and secondary node (SN). The MN may be a base station that is responsible for managing handover signaling, paging, and bearer setup/release procedures, for example. The SN may be a base station that provides additional resources to the UE but may not perform the management functions of the MN. In some cases, a UE may first establish a connection with an MN, and then establish communications with (e.g., use additional resources from) the SN. The MN and SN may operate on different carrier frequencies and may communicate with the UE via the same or different radio access networks (RANs), such as via an LTE RAN or NR RAN.

In some cases, performing MDT measurements on a base station while the UE is operating in a single-connectivity configuration may not accurately capture the performance of the network for a dual-connectivity configuration. That is, the quality of service measurements collected from a single node (e.g., a base station) while the UE is operating in a single-connectivity configuration may differ from the quality of service measurements collected from the node while the UE is operating in a dual-connectivity configuration.

There may be multiple reasons for differences in the network performance for a dual-connectivity configuration relative to a single-connectivity configuration. For example, a dual-connectivity configuration may support or implement uplink power sharing between different RANs (e.g., when the MN uses a different RAN than the SN), uplink and/or downlink transmission sharing by the two base stations (which may degrade throughput and increase latency for communications with one or both of the base stations), restrictions on feature portions associated with each base station while operating in the dual-connectivity configuration, restrictions on frequency band combinations for the two RANs, restrictions on carrier aggregation and resource allocation, and the use of split radio bearers. Beneficially, increasing throughput and reducing latency with the with one or both of the base stations based on information obtained from MDT measurements may assist one or more transceivers of the UE to perform effective wireless communications while the UE is operating in a dual-connectivity configuration.

Thus, in some cases the network performance of a dual-connectivity configuration may be assessed by using a UE to perform MDT measurements while the UE is operating in a dual-connectivity configuration.

Aspects of the disclosure are initially described in the context of a wireless communications system. Aspects of the disclosure are further illustrated by and described with reference to process flows, apparatus diagrams, system diagrams, and flowcharts that relate to MDTs for dual connectivity.

FIG. 1 illustrates an example of a wireless communications system 100 that supports MDT for dual connectivity in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology or NR radio access technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight portion associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight portions associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight portions applied to signals received at a plurality of antenna elements of an antenna array, or by processing received signals according to different receive beamforming weight portions applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $Ts=1/30,720,000$ seconds. Time intervals of a communications resource may be organized according to radio frames each having a duration of 10 milliseconds (ms), where the frame period may be expressed as $Tf=307,200$ Ts. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a portion of radio frequency spectrum resources having a defined physical layer structure for supporting communications over a communication link 125. For example, a carrier of a communication link 125 may include a portion of a radio frequency spectrum band that is operated according to physical layer channels for a given radio access technology (RAT), such as LTE or NR. A RAN may be a network that is used to perform communications for a given RAT, for example. Thus, a RAN may be an LTE RAN, an NR RAN, or another type of RAN.

Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., portion of subcarriers or RBs) within a carrier (e.g., "in-band" configuration of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a portion of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, wireless communications system 100 may include a first base station 105 that may operate in a first RAN and a second base station 105 that may operate in a second RAN, where the second RAN may be the same as or different from the first RAN. In either case, a UE 115 may be configured to communicate with cells on the first base station 105 and the second base station 105 (e.g., in a dual-connectivity configuration). For example, the UE 115 may be configured to receive and transmit data with a first cell on the first base station 105 while receiving or transmitting different or related data with a second cell on the second base station 105.

Wireless communications system 100 may support MDTs for dual-connectivity configurations. As described herein, a UE 115 operating in a dual-connectivity configuration may receive at least one request for MDT measurements. For example, the UE may receive a single request from an MN (e.g., base station 105), or requests from both the MN and the SN (base station 105). The UE may perform measurements associated with the MN and may perform measurements associated with the MN. The UE may perform the measurements while the UE is operating in the dual-connectivity configuration.

One or more of UEs 115 may include a UE communications manager, which may identify that the UE is operating in a dual-connectivity configuration with a first base station and a second base station. The UE communications manager may receive at least one request for MDT measurements. The UE communications manager may perform, based at least in part on the at least one request, a first portion of measurements associated with the first base station while the UE is operating in the dual-connectivity configuration and may perform, based at least in part on the at least one request, a second portion of measurements associated with the second base station while the UE is operating in the dual-connectivity configuration. The UE communications manager may transmit one or more reports including information indicative of the first portion of measurements, information indicative of the second portion of measurements, or both.

One or more of the base stations 105 may include a base station communications manager. In some cases, a base station communications manager may identify that the base station is a master node for a UE operating in a dual-connectivity configuration. The base station communications manager may receive a first MDT trace request and transmit a second MDT trace request to a second base station operating as a secondary node for the UE, the second MDT trace request being based on the first MDT trace request. The base station communications manager may transmit a request for one or more MDT measurements to be reported by the UE in accordance with at least the first MDT trace request.

In some cases, a base station communications manager may identify that the base station is a secondary node for a UE operating in a dual-connectivity configuration. The base station communications manager may receive, from a second base station that is a master node for the UE in the dual-connectivity configuration, an MDT trace request associated with the UE, and may transmit a request for one or more MDT measurements to be reported by the UE based at least in part on receipt of the MDT trace request from the master node.

Figure 2:
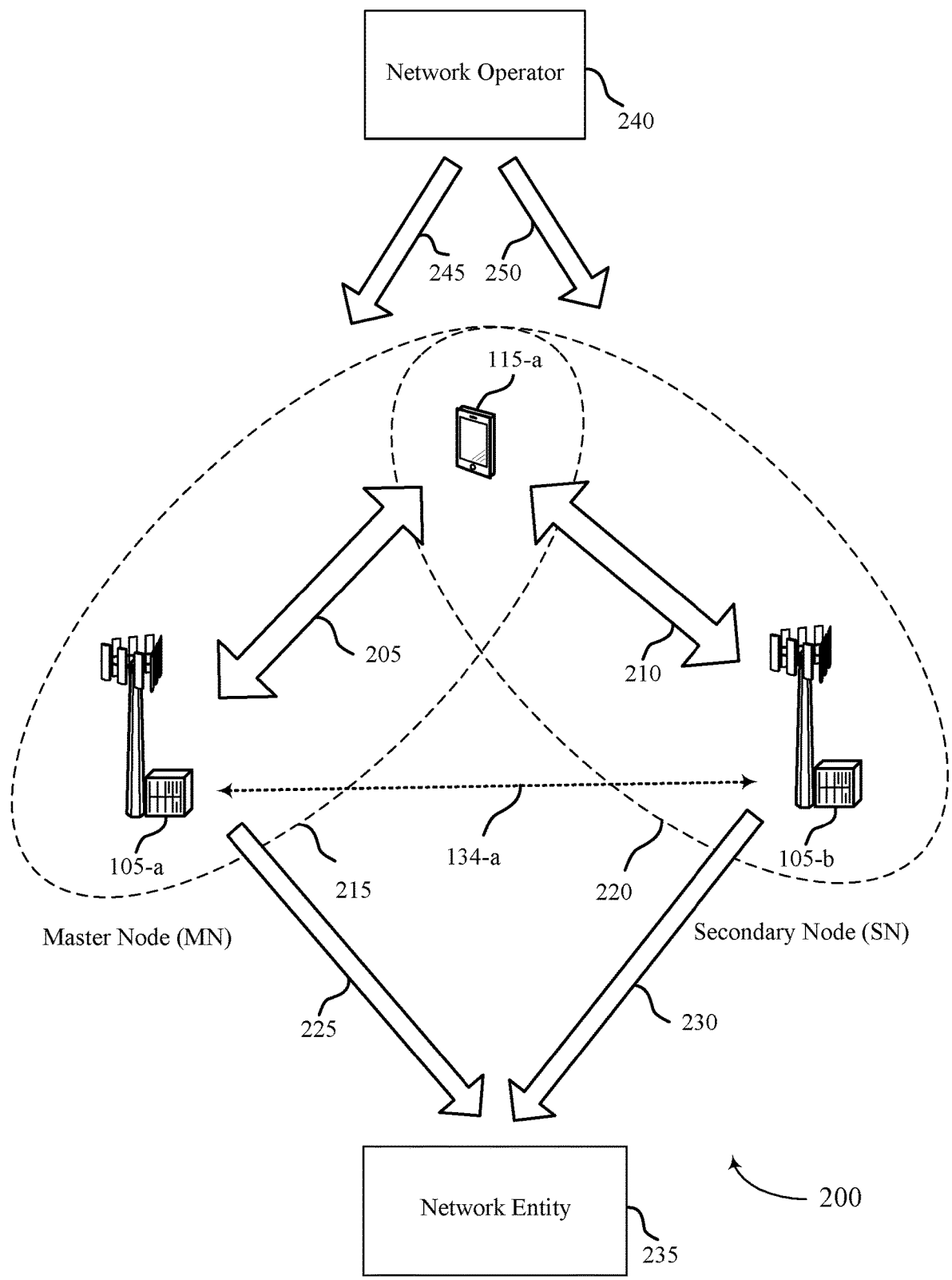
FIG. 2 illustrates an example of a system for wireless communications that supports minimization of drive tests for dual connectivity in accordance with aspects of the present disclosure.

FIG. 2 illustrates an example of a wireless communications system 200 that supports MDTs in dual connectivity in accordance with various aspects of the present disclosure. In some examples, wireless communications system 200 may implement aspects of wireless communications system 100. Wireless communications system 200 may include base station 105-*a*, base station 105-*b*, and UE 115-*a*, which may be examples of base stations 105 and UEs 115 as described above with reference to FIG. 1.

Base station 105-*a* may be an MN in a dual-connectivity configuration with UE 115-*a* and base station 105-*b* may be an SN in a dual-connectivity configuration with UE 115-*a*. Base station 105-*a* may be associated with a master coverage group (MCG) having a first coverage area 215 and base station 105-*b* may be associated with a secondary coverage group (SCG) having a second coverage area 220.

UE 115-*a* may be configured to operate in a dual-connectivity configuration to communicate with base station 105-*a* and base station 105-*b* simultaneously. In some cases, UE 115-*a* may be configured to communicate with base station 105-*a* on a master serving cell on a master carrier 205 and to communicate with base station 105-*b* on a secondary serving cell on a secondary carrier 210.

In some cases, base station 105-*a* (e.g., an MN) may be a base station that terminates at the S1-MME interface (e.g., an interface between the base station and the MME) and may be responsible for managing handover signaling, paging, and bearer setup/release procedures for communications with UE 115-*a*, for example.

Base station 105-*b* (e.g., an SN) may be a base station that provides additional resources to the UE but may not perform the management functions of base station 105-*a*. Base station 105-*a* and base station 105-*b* may operate on different carrier frequencies and may communicate with the UE via the same or different radio access technologies (RATs), such as via an LTE RAT or an NR RAT. Base station 105-*a* and base station 105-*b* may communicate with each other via backhaul links 134-*a*, such as Xn.

Network operator 240 may communicate with base station 105-*a* and base station 105-*b* via communication link 245 and communication link 250, respectively. Communication links 245, 250 may enable direct communication with base station 105-*a* and base station 105-*b* for area-based MDT, or may enable network operator 240 to communicate with base station 105-*a* and base station 105-*b* via unified data management (UDM) or home subscriber service (HSS) connections for signaling-based MDT. The UDM/HSS may, in turn, communicate with UE 115-*a* via an access and management mobility function (AMF) or MME, for example.

Network entity 235 may communicate with base station 105-*a* and/or base station 105-*b* via communication link 225 and communication link 230, respectively. Network entity 235 may be a trace collection entity (TCE) or a file server, for example.

As described herein, base station 105-*a* may identify that base station 105-*a* is operating as an MN in a dual-connectivity configuration with UE 115-*a*. Base station 105-*a* may receive a trace request initiated by network operator 240, and may transmit a request for MDT measurements to UE 115-*a*. The request may include measurement configuration information for base station 105-*a*.

In some cases, base station 105-*a* may transmit a second trace request to base station 105-*b*. The second trace request may be transmitted as a separate trace start request message, for example, or may be included within a handover/addition/modification request.

Base station 105-*b* may identify that base station 105-*b* is operating as an SN in a dual-connectivity configuration with UE 115-*a*. In response to receiving the second trace request from base station 105-*a*, base station 105-*b* may transmit a request for MDT measurements directly to UE 115-*a* via secondary carrier 210, which may include measurement configuration information for base station 105-*b*. In some cases, secondary carrier 210 may include a direct signaling radio bearer, for example. Alternatively, base station 105-*b* may transmit measurement configuration information for base station 105-*b* to UE 115-*a* indirectly, via base station 105-*a*, by transmitting the measurement configuration information to base station 105-*a* on a backhaul link 134-*a*. In the latter case, base station 105-*a* may transmit the measurement configuration information for base station 105-*b* to UE 115-*a* along with its own measurement configuration information.

In some cases, the MDT measurements to be performed by UE 115-*a* may include a first portion (e.g., a first set) of measurements associated with base station 105-*a* and a second portion (e.g., a second set) of measurements associated with base station 105-*b*. For example, MDT measurements for a base station having a first RAN (e.g., NR) may be different than MDT measurements for a base station having a second RAN (e.g., LTE).

Thus, UE 115-*a* may perform the first portion of measurements associated with base station 105-*a* according to the measurement configuration information for base station 105-*a*, and UE 115-*a* may perform the second portion of measurements associated with base station 105-*b* according to the measurement configuration information for base station 105-*b*. UE 115-*a* may perform the first portion of measurements and the second portion of measurements while operating in the dual-connectivity configuration with base station 105-*a* and base station 105-*b*. In this case, the MDT measurements may reflect the effect of various operational aspects and constraints associated with the dual-connectivity configuration, such as uplink power sharing, transmission sharing, feature portion restrictions, split bearers, etc.

After performing the first portion of the measurements and the second portion of the measurements, UE 115-*a* may transmit one or more reports including information indicative of the first portion of measurements, information indicative of the second portion of measurements, or both. For example, in some cases, if UE 115-*a* receives a request from the MN that specifies measurement configuration information for both the MN and the SN, UE 115-*a* may transmit a single, combined measurement report to the MN that includes information indicative of measurements associated with the MN and information indicative of the measurements associated with the SN. That is, UE 115-*a* may transmit a single, combined report to base station 105-*a* that includes information indicative of the first portion of measurements and information indicative of the second portion of measurements.

In some cases, the information indicative of the measurements may include the results of the measurements, a summary of the results of the measurements, and/or other metrics that may be determined based on the results of the measurements, for example. In some cases, if UE 115-*a* receives separate requests for MDT measurements from the MN and the SN, UE 115-*a* may transmit separate reports to the MN and the SN that include the information indicative of the measurements associated with the respective node. That is, UE 115-*a* may transmit separate reports to base station 105-*a* and base station 105-*b* by transmitting a first report that includes information indicative of the first portion of measurements to base station 105-*a*, and transmitting a second report that includes information indicative of the second portion of measurements to base station 105-*b*.

Additional details regarding signaling associated with MDT tests for dual connectivity are described with reference to process flows 300 and 400.

Figure 3:
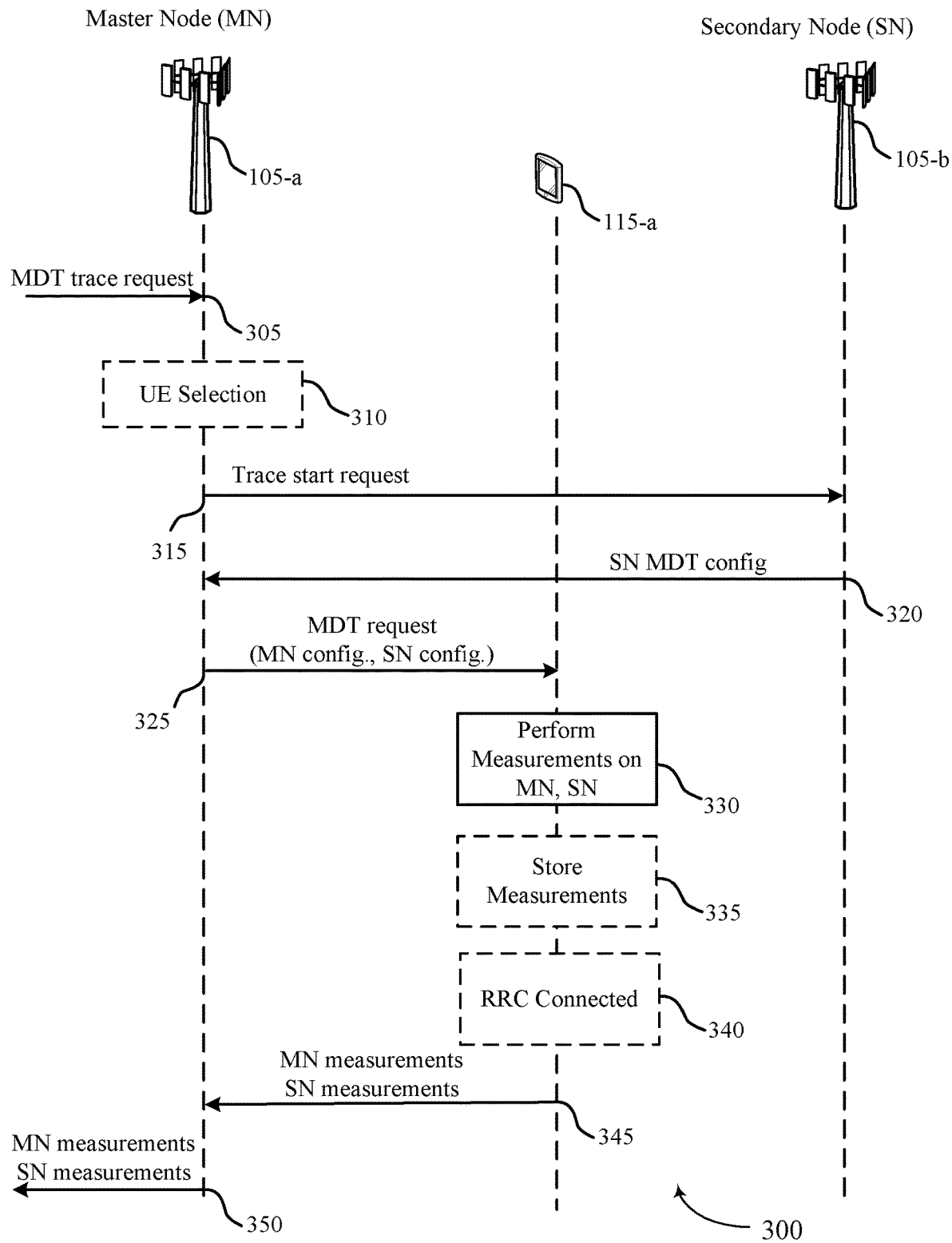
FIG. 3 illustrates an example of a process flow that supports minimization of drive tests for dual connectivity in accordance with aspects of the present disclosure.

FIG. 3 illustrates an example of a process flow 300 that supports MDTs for dual connectivity in accordance with aspects of the present disclosure. In some examples, process flow 300 may implement aspects of wireless communications systems 100 and 200. Process flow 300 may include UE 115-*a*, a first base station 105-*a* (e.g., an MN in a DC configuration with UE 115-*a*), and a second base station 105-*b* (e.g., an SN in the DC configuration with UE 115-*a*), which may be examples of UEs 115 and base stations 105 as described above with reference to FIGS. 1 and 2.

Process flow 300 may depict an example of communications between base stations 105-*a*, 105-*b* and UE 115-*a* when UE 115-*a* receives a single request for MDT measurements (e.g., from base station 105-*a*).

In the following description of the process flow 300, the operations between UE 115-*a*, base station 105-*a*, and base station 105-*b* may be performed in different orders or at different times. Certain operations may also be left out of the process flow 300, or other operations may be added to the process flow 300. It is to be understood that while UE 115-*a* is shown performing a number of the operations of process flow 300, any wireless device may perform the operations shown.

At 305, base station 105-*a* may receive a first MDT trace request. For area-based MDT, in which base station 105-*a* may select a UE from within an area to perform the MDT measurements, the first MDT trace request may be received directly from the network operator. For signaling-based MDT, in which the first MDT request includes an indication of a specific UE 115-*a* to perform the MDT measurements, the MDT trace request may be received via an AMF (e.g., for an NR base station) or via an MME (e.g., for an LTE base station). The indication of UE 115-*a* may include a device identifier associated with UE 115-*a*, for example. In some cases, an AMF may transmit the first MDT trace request to base station 105-*a* via a handover request, or within an initial UE context setup, or as a trace start message, for example.

At 310, for area-based MDT, base station 105-*a* may, based on receiving the first MDT trace request, select a particular UE 115-*a* to perform the MDT measurements. (For signaling-based MDT, 310 may not be performed, as the UE 115-*a* may be specified by a device identifier in the first MDT trace request.) In some cases, base station 105-*a* may select UE 115-*a* based on various criteria. Such criteria may include a user consent associated with UE 115-*a* indicating that a user has consented for UE 115-*a* to be used for MDT measurements. The user consent may include subscription-related data, and in some cases, the user consent may be a common user consent for two or more RANs (e.g., for LTE and NR), for single-connectivity MDTs, and/or for dual-connectivity MDTs. In some cases, the user consent may be delivered from the core network to a RAN associated with the base station 105-*a* as part of an initial UE context setup or within a handover request, for example.

Such criteria may include a capability of the UE 115-*a*, such as an MDT capability, which may be part of a radio capability of UE 115-*a*. An MDT capability may be specified by a UE configuration field, for example. In some cases, an MDT capability may be specified in one or more configuration fields of one or more information elements that may indicate, for example, that UE 115-*a* is configured for (or capable of) performing one or more of: MDT measurements in a dual-connectivity configuration (DC-MDT), MDT measurements in a dual-connectivity configuration with different RANs, such as with an NR base station and an LTE base station (which may be referred to as EN-DC); concurrent MDT measurements on the master node and secondary node in a dual-connectivity configuration; logged measurements, global navigation satellite system (GNSS) location, location report, uplink-PDCP delay, and/or LTE MDT.

Such criteria may include an area associated with the UE 115-*a*. For example, an area may be associated with UE 115-*a* if UE 115-*a* is included in a tracking area identifier (TAI) list for the area, or in a RAN-based notification area (RNA) list for the area, or in a cell list for the area.

Such criteria may include a public land mobile network (PLMN) list associated with the UE 115-*a*.

At 315, base station 105-*b* may transmit a second MDT trace request to base station 105-*b*. In some cases, the second MDT trace request may be transmitted as a separate trace start request. In some cases, the second MDT trace request may be included in an SN addition request, an SN modification request, or a handover request. For signaling-based MDT, the second MDT trace request may include the indication of UE 115-*a*.

At 320, base station 105-*a* may receive, from base station 105-*b*, measurement configuration information associated with base station 105-*b*.

At 325, base station 105-*a* may transmit, to UE 115-*a*, a request for one or more MDT measurements to be reported by UE 115-*a* in accordance with (e.g., according to) the first MDT trace request. In some cases, the request for MDT measurements may include measurement configuration information associated with base station 105-*a* and measurement configuration information associated with base station 105-*b*, for example.

In some cases, the measurement configuration information may include information related to the RAT associated with the MN and/or the SN. In some cases, the measurement configuration information may include one or more fields indicating one or more RATs that may be used by the UE for performing the MDT measurements, and/or indicating one or more RATs that may be used by the UE or by a base station for transmitting the resulting report(s). In some cases, for example, the measurement configuration information may specify that a UE may perform the MDT measurements on a first RAT and report the measurements on a different RAT.

In some cases, the MDT measurements may include various QoS or quality of experience (QoE) measurements. For example, the MDT measurements may include UE statistics on a per quality of service class identifier (QCI) basis, which may include: throughput as measured by a base station 105 at a MAC upper service access point (SAP), packet loss as measured by a base station 105 at a PDCP upper SAP, uplink and/or downlink data volume measured by a base station 105 at a PDCP upper SAP, downlink delay measured by a base station 105 at PDCP upper SAP, uplink delay measured by the UE 115 at PDCP.

In some cases, the MDT measurements may include UE statistics on a per data radio bearer (DRB) basis, which may include scheduled IP throughput for MDT measured by a base station 105 at a MAC upper SAP.

In some cases, the MDT measurements may include RAN measurements, which may be transparent to the UE. In some cases, the MDT measurements may include beam measurements; e.g., measurements associated with beamforming.

In some cases, the MDT measurements may enable QoS verification for the dual-connectivity configuration by performing measurements that may include PDCP measurements, RLC/MAC measurements (e.g., throughput) for a split bearer, and flow-level measurements.

In some cases, the RLC/MAC measurements may be measured separately by the MN (e.g., base station 105-*a*) and by the SN (e.g., base station 105-*b*). In other cases, the MN (e.g., base station 105-*a*) and the SN (e.g., base station 105-*b*) may gather and combine measurements reported by one or more UEs 115.

In some cases, the MDT measurements may include flow-level measurements that may measure various QoS (such as throughput) and/or QoE metrics for a "flow," which may be a signal path between a base station 105 and the UE 115. A flow may include a split bearer in a DC configuration, for example, where a split bearer may be a bearer that is transmitted and received via both the MN and the SN. In some cases, the flow-level measurements may be performed at the service data adaptation protocol (SDAP) layer, and may be used to verify whether the QoS configured by the core network is met. In some cases, a flow-level QoS may be defined or configured in addition to a DRB-level QoS, which may be performed at the PDCP layer.

At 330, UE 115-*a* may receive the request for one or more MDT measurements from base station 105-*a* and may perform, in response to receiving the request, a first portion of measurements associated with base station 105-*a* and a second portion of measurements associated with the base station 105-*b*. The first portion of measurements may include MDT measurements as specified by the measurement configuration information associated with base station 105-*c*, and the second portion of measurements may include MDT measurements as specified by the measurement configuration information associated with base station 105-*d*. The UE may perform the first portion of measurements and the second portion of measurements while UE 115-*a* is operating in the dual-connectivity configuration; e.g., while UE 115-*a* is concurrently connected with base station 105-*a* and base station 105-*b*. In some cases, UE 115-*a* may perform the first portion of measurements on base station 105-*a* based on the measurement configuration information associated with base station 105-*a*, and may perform the second portion of measurements on base station 105-*b* based on the measurement configuration information associated with base station 105-*b*.

For logged MDT, UE 115-*a* may receive the request for one or more MDT measurements and perform the first portion and second portion of measurements while UE 115-*a* is operating in an RRC inactive mode (e.g., connected with base station 105-*a* and 105-*b* but inactive). For logged MDT, the UE 115-*a* may perform the first portion of measurements concurrently with performing the second portion of measurements. In this case, the UE 115-*a* may be configured for concurrent measurements by base station 105-*a* and/or base station 105-*b* via a configuration flag.

For immediate MDT, UE 115-*a* may receive the request for one or more MDT measurements and perform the first and second portions of measurements while UE 115-*a* is operating in an RRC connected mode.

At 335, for logged MDT, UE 115-*a* may store the results of the first portion of measurements and/or the results of the second portion of measurements. In some cases, UE 115-*a* may store the results of the first and/or second portions of measurements while UE 115-*a* is operating in the RRC inactive mode.

At 340, for logged MDT, UE 115-*a* may enter the RRC connected mode with base station 105-*a* and/or base station 105-*b*. (For immediate MDT, UE 115-*a* may already be operating in the RRC connected mode.) In some cases, entering the RRC connected mode (e.g., including RRC setup/resume complete) may include transmitting an indication, to base station 105-a, that an MDT log is available for base station 105-a (e.g., a report including information indicative of the measurements associated with base station 105-a), base station 105-b (e.g., a report including information indicative of the measurements associated with 105-b), or both.

At 345, UE 115-a may transmit a report to base station 105-a. The report may include information indicative of the first portion of measurements, information indicative of the second portion of measurements, or both. The UE 115-a may transmit the report via RRC signaling and/or using X2/Xn messages, for example.

In logged MDT the UE 115-a may transmit the report to base station 105-a in response to receiving a request, from base station 105-a, to transmit the log. For example, base station 105-a may fetch the report using a UE information request/response procedure.

At 350, base station 105-a may transmit a report that includes the information indicative of the first portion of measurements, the information indicative of the second portion of measurements, or both to a network entity, such as a TCE.

In some cases, the report may include an indication of the first base station, an indication of the second base station, a cell identifier associated with the first base station, and a cell identifier associated with the second base station. Such information may enable the network to correlate or combine the information indicative of the first portion of measurements with the information indicative of the second portion of measurements; e.g., to correlate or combine measurements for the MN and the SN to determine, for example, whether QoS metrics are being met in the dual-connectivity configuration.

In some cases, the report may be anonymized (e.g., certain details regarding the UE 115-a may be omitted) based on a configured anonymization level. For example, in some cases, the report may omit any device identifiers associated with the UE 115-a. In some cases, the base station 105-a may request that the AMF provides a device identifier for the UE 115-a (such as an IMEI-TAC) to the network entity via a cell traffic trace message. In some cases, the report may include an international mobile subscriber identity/unified payments identity (IMSI/UPI) for UE 115-a.

In some cases, if a base station 105 is unable to complete a trace request (e.g., if the MDT fails), a base station 105 may indicate a failure in an Xn/X2 Trace Activation Failure message. In some cases, trace deactivation may be indicated in an Xn/X2 Trace Deactivation message.

Figure 4:
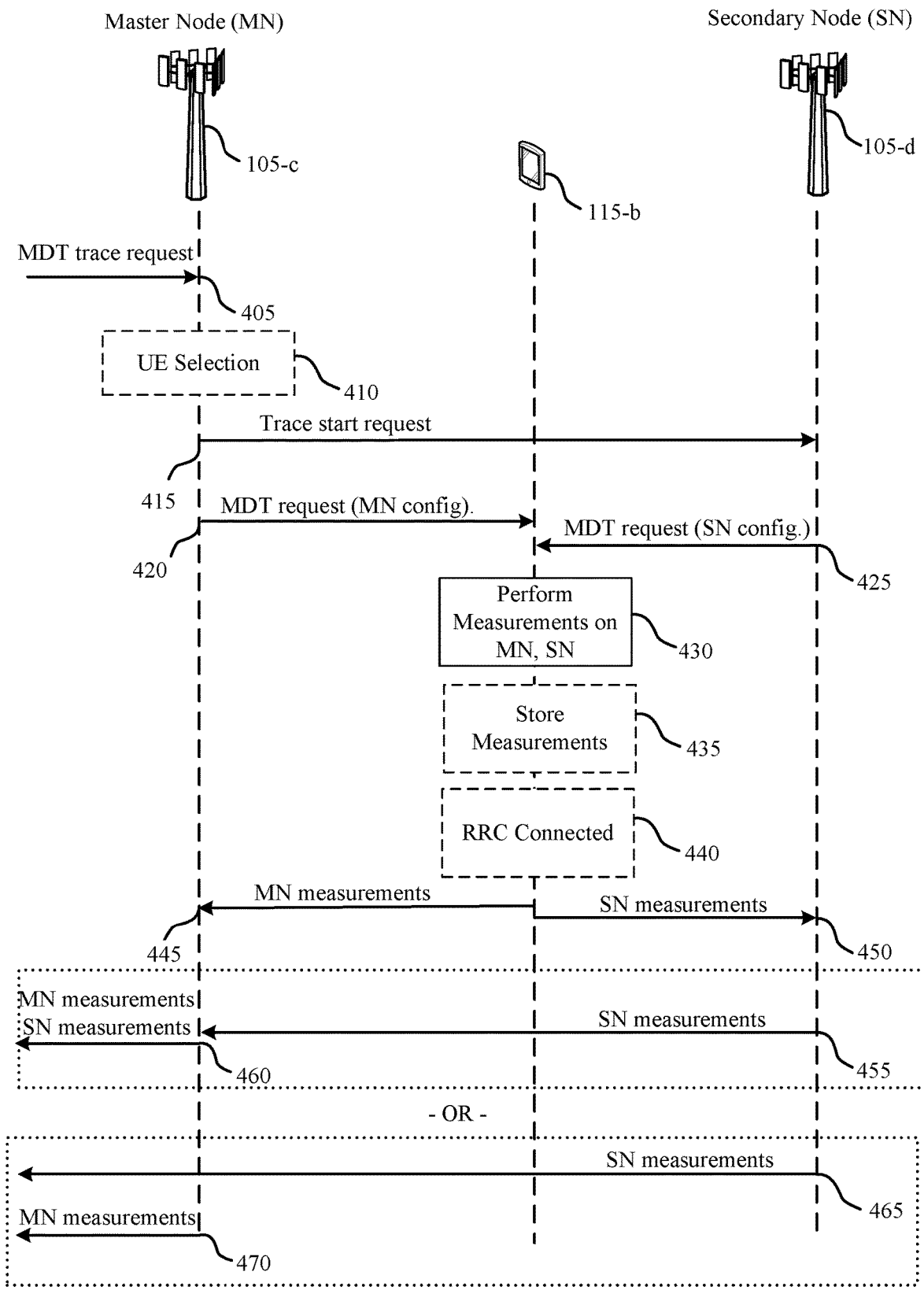
FIG. 4 illustrates an example of a process flow that supports minimization of drive tests for dual connectivity in accordance with aspects of the present disclosure.

FIG. 4 illustrates an example of a process flow 400 that supports MDTs for dual connectivity in accordance with aspects of the present disclosure. In some examples, process flow 400 may implement aspects of wireless communications systems 100 and 200. Process flow 400 may include UE 115-b, a first base station 105-c (e.g., an MN in a DC configuration with UE 115-b), and a second base station 105-d (e.g., an SN in the DC configuration with UE 115-b), which may be examples of UEs 115 and base stations 105 as described above with reference to FIGS. 1 and 2.

Process flow 400 may depict an example of communications between base stations 105-c, 105-d and UE 115-b when UE 115-b receives two requests to report MDT measurements—one request from the MN (base station 105-c), and one request from the SN (base station 105-d).

In the following description of the process flow 400, the operations between UE 115-b, base station 105-c, and base station 105-d may be performed in different orders or at different times. Certain operations may also be left out of the process flow 400, or other operations may be added to the process flow 400.

In some cases, aspects of the process flow 300 as depicted in FIG. 3 may be combined with and/or substituted for aspects of process flow 400, and vice versa. For example, a UE 115 may receive a single request to report MDT results from the MN as depicted at 325 of process flow 300, and the UE 115 may transmit separate reports to the MN and SN as depicted at 415, 420 of process flow 400 rather than transmitting a single report to the MN as depicted at 345 of process flow 300. Portions of the descriptions of operations performed in process flow 300 may also apply to operations performed in process flow 400. Furthermore, it is to be understood that while UE 115-b is shown performing a number of the operations of process flow 400, any wireless device may perform the operations shown.

At 405, base station 105-c may receive a first MDT trace request. For area-based MDT, in which base station 105-c may select a UE from within an area to perform the MDT measurements, the first MDT test trace request may be received directly from a network operator (e.g., network operator 240). For signaling-based MDT, in which the first MDT trace request includes an indication of a specific UE 115-b to perform the MDT measurements, the MDT trace request may be received from the network operator via an AMF (e.g., for an NR base station) or via a n MME (e.g., for an LTE base station). The indication of UE 115-b may include a device identifier associated with UE 115-b, for example.

At 410, for area-based MDT, base station 105-c may, based on receiving the first MDT trace request, select a particular UE 115-b to perform the MDT measurements, as described with reference to 310 of process flow 300. For signaling-based MDT, 410 may not be performed.

At 415, base station 105-c may transmit a second MDT trace request to base station 105-d. For signaling-based MDT, the second MDT trace request may include the indication of UE 115-b.

At 420, base station 105-c may transmit, to UE 115-b, a first request for one or more MDT measurements to be reported by UE 115-b in accordance with (e.g., according to) the first MDT trace request. In some cases, the first request may include measurement configuration information associated with base station 105-c.

At 425, base station 105-d may transmit, to UE 115-b, a second request for one or more MDT measurements to be reported by UE 115-b. In some cases, the second request may include measurement configuration information associated with base station 105-d. In some cases, the second request may be transmitted from base station 105-d to UE 115-b via a direct signaling radio bearer, such as SRB3. SRB3 may provide a direct communication link from base station 105-d to UE 115-b. In some cases, 425 may occur before 420, after 420, or concurrently with 420.

UE 115-b may receive the two requests for the UE 115-b to report the MDT measurements and, at 430, UE 115-b may perform a first portion of measurements associated with the first base station 105-c and a second portion of measurements associated with the second base station 105-d. The first portion of measurements may include MDT measurements specified by the measurement configuration information associated with base station 105-c, and the second portion of measurements may include MDT measurements specified by the measurement configuration information associated with base station 105-d. UE 115-b may perform the first portion of measurements and the second portion of measurements while UE 115-*b* is operating in the dual-connectivity configuration; e.g., while UE 115-*b* is concurrently connected with base station 105-*c* and base station 105-*d*. In some cases, UE 115-*b* may perform the first portion of measurements associated with base station 105-*c* based on the measurement configuration information associated with base station 105-*c*, and may perform the second portion of measurements associated with base station 105-*d* based on the measurement configuration information associated with base station 105-*d*.

For logged MDT, UE 115-*b* may receive the two requests for UE 115-*b* to report the MDT measurements and perform the first and second portions of measurements while UE 115-*b* is operating in an RRC inactive mode. For logged MDT, the UE 115-*b* may perform the first portion of measurements concurrently with performing the second portion of measurements. In this case, the UE 115-*b* may be configured for concurrent measurements by base station 105-*c* and/or base station 105-*d* via a configuration flag.

For immediate MDT, UE 115-*b* may receive the two requests for UE 115-*b* to report the MDT measurements and perform the first and second portions of measurements while UE 115-*b* is operating in an RRC connected mode.

At 435, for logged MDT, UE 115-*b* may store the results of the first portion of measurements and/or the results of the second portion of measurements. In some cases, UE 115-*b* may store the results of the first and/or second portions of measurements while UE 115-*b* is operating in an RRC inactive mode. 435 may not be performed for immediate MDT.

At 440, for logged MDT, UE 115-*b* may enter the RRC connected mode with base station 105-*c* and/or base station 105-*d*. (For immediate MDT, UE 115-*b* may already be operating in the RRC connected mode.) In some cases, entering the RRC connected mode may include transmitting an indication, to base station 105-*c*, that a log is available for base station 105-*c*, base station 105-*d*, or both. 440 may not be performed for immediate MDT.

At 445, UE 115-*b* may transmit a report to base station 105-*c*. The report may include information indicative of the first portion of measurements. The UE 115-*b* may transmit the report via RRC signaling and/or using X2/Xn messages, for example.

In logged MDT the UE 115-*b* may transmit the report to base station 105-*c* in response to receiving a request, from base station 105-*c*, to transmit the log.

At 450, UE 115-*b* may transmit a report to base station 105-*d*. The report may include information indicative of the second portion of measurements. The UE 115-*b* may transmit the report via RRC signaling and/or using X2/Xn messages, for example. In some cases, the report may be transmitted using an RRC container in an uplink RRC transfer, for example.

In logged MDT the UE 115-*b* may transmit the report to base station 105-*d* in response to receiving a request, from base station 105-*d*, to transmit the log.

In some cases, the SN (base station 105-*d*) may transmit the information indicative of the second portion of measurements to the MN (base station 105-*c*), and the MN may combine or correlate the information indicative of the second portion of measurements (e.g., received from the SN) with the information indicative of the first portion of measurements, then transmit a combined report to the network entity. This approach is depicted at 455, 460 of process flow 400.

In this case, at 455, base station 105-*d* may transmit, to base station 105-*c*, a report that includes information indicative of the measurements associated with base station 105-*d*.

At 460, base station 105-*c* may combine or correlate the information indicative of the measurements associated with base station 105-*d* with the information indicative of the measurements associated with base station 105-*c* to generate information indicative of overall measurements and transmit, to a network entity, a report that includes the information indicative of the overall measurements. In some cases, 460 may occur before 455, after 455, or concurrently with 455.

Alternatively, in some cases, the SN may transmit a report that includes the information indicative of measurements associated with the SN to the network entity, and the MN may transmit a (separate) report that includes the information indicative of the measurements associated with the MN to the network entity. This approach may be an alternative to 455, 460 of process flow 400, and is depicted at 465, 470 of process flow 400.

In this case, at 465, base station 105-*d* may transmit, to the network entity, a report that includes the information indicative of the measurements associated with base station 105-*d*. In some cases, the report may include an indication of base station 105-*d* and/or a cell identifier associated with base station 105-*d*.

At 470, base station 105-*c* may transmit, to the network entity, a report that includes the information indicative of the measurements associated with base station 105-*c*. In some cases, the report may include an indication of base station 105-*c* and/or a cell identifier associated with base station 105-*c*. In some cases, 470 may occur before 465, after 465, or concurrently with 465.

In some cases, the network entity (e.g., a TCE) may combine or correlate the information indicative of the measurements associated with base station 105-*c* with the information indicative of the measurements associated with base station 105-*d* (e.g., based on the indication of base station 105-*c*, 105-*d* and/or on the cell identifier associated with base station 105-*c*, 105-*d*) to evaluate network performance for the dual-connectivity configuration, for example.

In some cases, the request for MDT measurements may include an address of the report that includes information indicative of the measurements. The address may be either an address associated with the network entity or an address associated with the MN, depending on whether the network entity or the MN (respectively) combines or correlates the information indicative of the measurements associated with the MN with the information indicative of the measurements associated with the SN.

In some cases, the request to report MDT measurements may include a trace identifier and/or a QoE server address.

Figure 5:
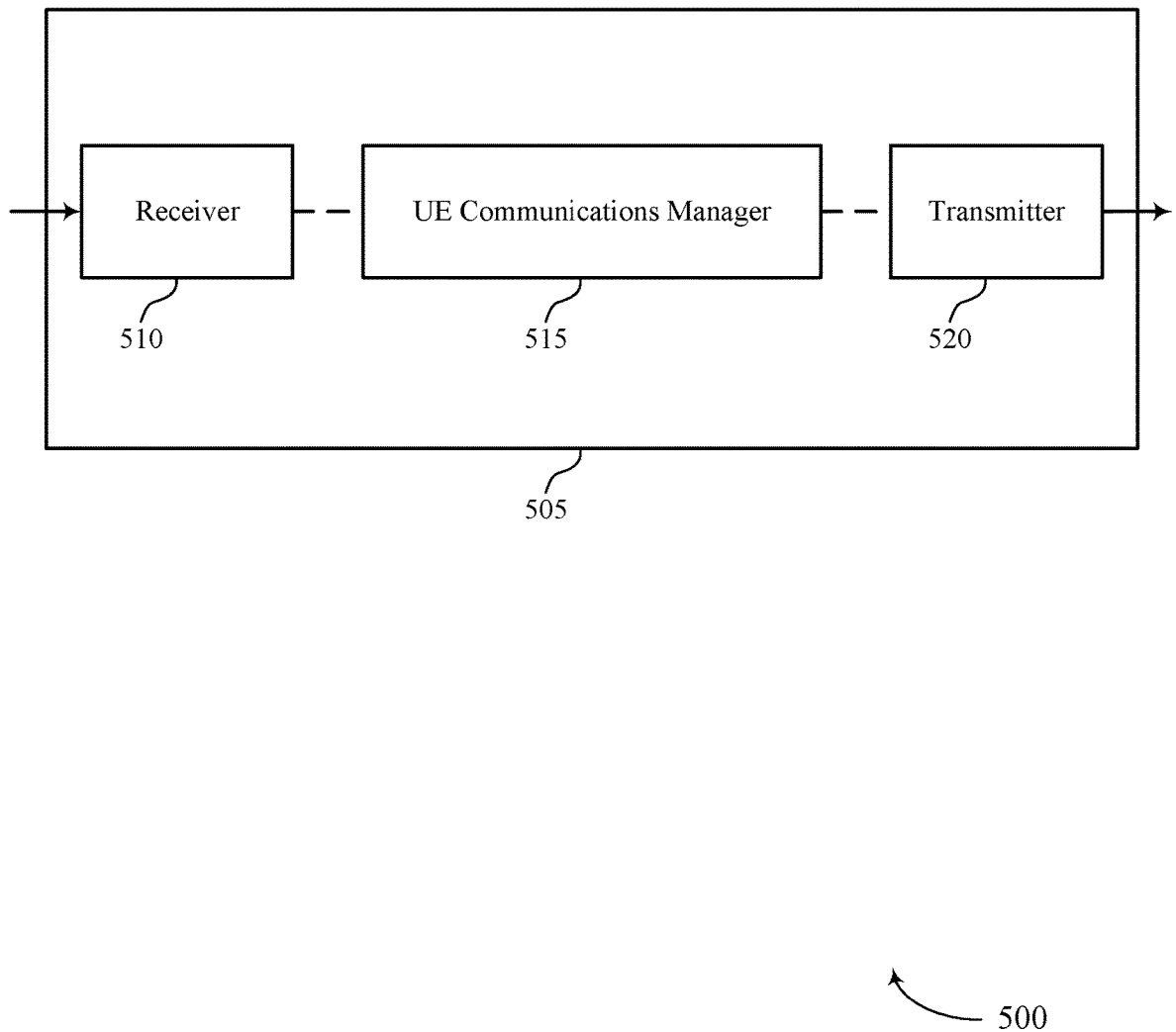
FIGS. 5 and 6 show block diagrams of devices that support minimization of drive tests for dual connectivity in accordance with aspects of the present disclosure.

FIG. 5 shows a block diagram 500 of a device 505 that supports MDT for dual connectivity in accordance with aspects of the present disclosure. The device 505 may be an example of aspects of a UE 115 as described herein. The device 505 may include a receiver 510, a UE communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to MDT for dual connectivity, etc.). Information may be passed on to other components of the device 505. The receiver 510 may be an example of aspects of the transceiver 820 described with reference to FIG. 8. The receiver 510 may utilize a single antenna or a set of antennas.

The UE communications manager 515 may identify that the UE is operating in a dual-connectivity configuration with a first base station and a second base station, receive at least one request for MDT measurements, perform, based on the at least one request, a first portion of measurements associated with the first base station while the UE is operating in the dual-connectivity configuration, perform, based on the at least one request, a second portion of measurements associated with the second base station while the UE is operating in the dual-connectivity configuration, and transmit one or more reports including information indicative of the first portion of measurements, information indicative of the second portion of measurements, or both. The UE communications manager 515 may be an example of aspects of the UE communications manager 810 described herein.

The UE communications manager 515, or its sub-components, may be implemented in hardware, code (e.g., software or firmware) executed by a processor, or any combination thereof. If implemented in code executed by a processor, the functions of the UE communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 515, or its sub-components, may be physically located at various positions, including being distributed such that portions of functions are implemented at different physical locations by one or more physical components. In some examples, the UE communications manager 515, or its sub-components, may be a separate and distinct component in accordance with various aspects of the present disclosure. In some examples, the UE communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
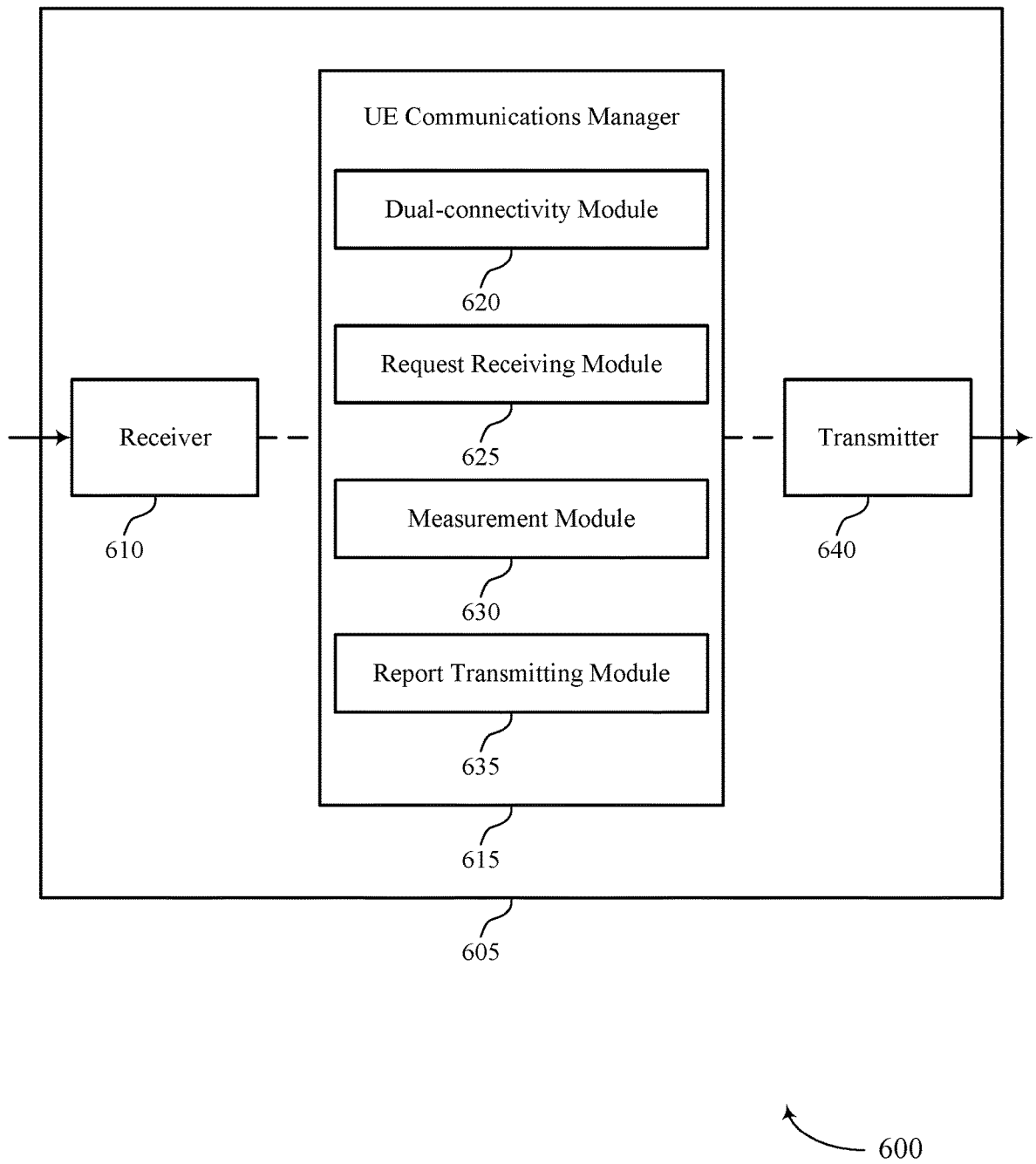

FIG. 6 shows a block diagram 600 of a device 605 that supports MDT for dual connectivity in accordance with aspects of the present disclosure. The device 605 may be an example of aspects of a device 505, or a UE 115 as described herein. The device 605 may include a receiver 610, a UE communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to MDT for dual connectivity, etc.). Information may be passed on to other components of the device 605. The receiver 610 may be an example of aspects of the transceiver 820 described with reference to FIG. 8. The receiver 610 may utilize a single antenna or a set of antennas.

The UE communications manager 615 may be an example of aspects of the UE communications manager 515 as described herein. The UE communications manager 615 may include a dual-connectivity module 620, a request receiving module 625, a measurement module 630, and a report transmitting module 635. The UE communications manager 615 may be an example of aspects of the UE communications manager 810 described herein.

The dual-connectivity module 620 may identify that the UE is operating in a dual-connectivity configuration with a first base station and a second base station.

The request receiving module 625 may receive at least one request for MDT measurements.

The measurement module 630 may perform, based on the at least one request, a first portion of measurements associated with the first base station while the UE is operating in the dual-connectivity configuration and perform, based on the at least one request, a second portion of measurements associated with the second base station while the UE is operating in the dual-connectivity configuration. In some cases, the measurement module 630 may perform the first portion of measurements and the second portion of measurements while the UE is operating in the RRC inactive mode.

The report transmitting module 635 may transmit one or more reports including information indicative of the first portion of measurements, information indicative of the second portion of measurements, or both.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
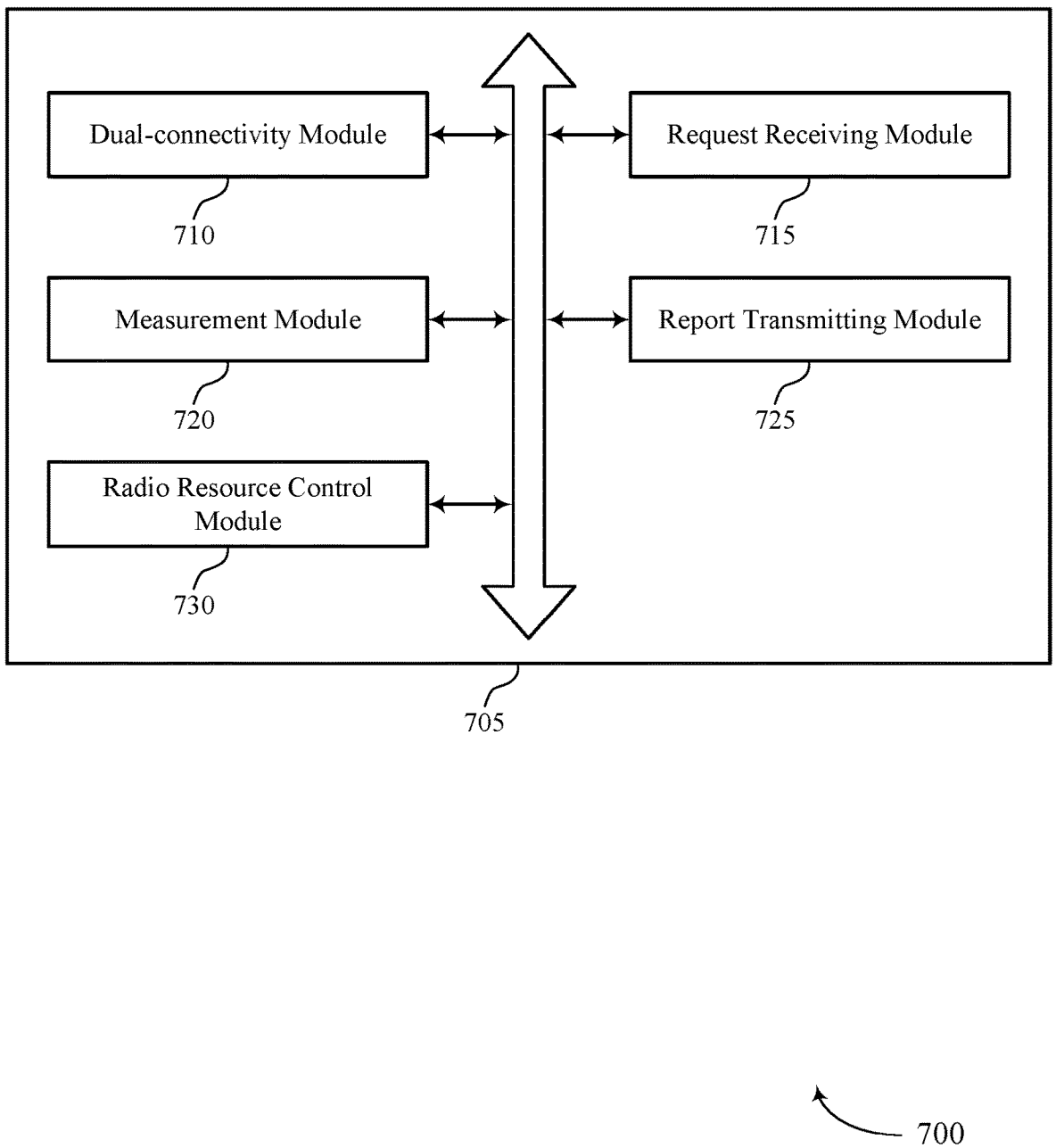
FIG. 7 shows a block diagram of a UE communications manager that supports minimization of drive tests for dual connectivity in accordance with aspects of the present disclosure.

FIG. 7 shows a block diagram 700 of a UE communications manager 705 that supports MDT for dual connectivity in accordance with aspects of the present disclosure. The UE communications manager 705 may be an example of aspects of a UE communications manager 515, a UE communications manager 615, or a UE communications manager 810 described herein. The UE communications manager 705 may include a dual-connectivity module 710, a request receiving module 715, a measurement module 720, a report transmitting module 725, and a radio resource control module 730. Each of these modules may communicate, directly or indirectly, with one another (e.g., via one or more buses).

The dual-connectivity module 710 may identify that the UE is operating in a dual-connectivity configuration with a first base station and a second base station. In some cases, the first base station is a master node in the dual-connectivity configuration and the second base station is a secondary node in the dual-connectivity configuration. In some cases, the first base station is associated with a first radio access network (RAN) and the second base station is associated with a second RAN.

The request receiving module 715 may receive at least one request for MDT measurements. In some examples, the request receiving module 715 may receive, from the first base station, a first measurement configuration for the first portion of measurements. In some examples, the request receiving module 715 may receive, from the second base station, a second measurement configuration for the second portion of measurements. In some examples, the request receiving module 715 may receive the second measurement configuration from the second base station via direct signaling radio bearer SRB3.

In some cases, the MDT measurements include one or more of: quality of service measurements or quality of experience measurements, one or more measurements of a split radio bearer associated with the first base station or the second base station, flow-level throughput measurements performed at the service data adaptation protocol (SDAP) layer, or data radio bearer (DRB) level throughput measurements performed at the packet data convergence protocol (PDCP) layer.

In some examples, the request receiving module 715 may receive, from the first base station, a first measurement configuration for the first portion of measurements and a second measurement configuration for the second portion of measurements.

The measurement module 720 may perform, based on the at least one request, a first portion of measurements associated with the first base station while the UE is operating in the dual-connectivity configuration. In some examples, the measurement module 720 may perform, based on the at least one request, a second portion of measurements associated with the second base station while the UE is operating in the dual-connectivity configuration. In some examples, the measurement module 720 may perform the first portion of measurements and the second portion of measurements while the UE is operating in the RRC inactive mode.

In some examples, the measurement module 720 may store results of the first portion of measurements and results of the second portion of measurements. In some cases, the first portion of measurements are performed concurrently with the second portion of measurements.

The report transmitting module 725 may transmit one or more reports including information indicative of the first portion of measurements, information indicative of the second portion of measurements, or both.

In some examples, the report transmitting module 725 may transmit, to the first base station, a first report including the information indicative of the first portion of measurements. In some examples, the report transmitting module 725 may transmit, to the second base station, a second report including the information indicative of the second portion of measurements. In some examples, the report transmitting module 725 may transmit, to the first base station, a first report that includes the information indicative of both the first portion of measurements and the second portion of measurements.

In some examples, the radio resource control module 730 may cause the UE to enter an RRC connected mode after storing the results of the first portion of measurements and the results of the second portion of measurements, and the UE may transmit the one or more reports while in the RRC connected mode.

Figure 8:
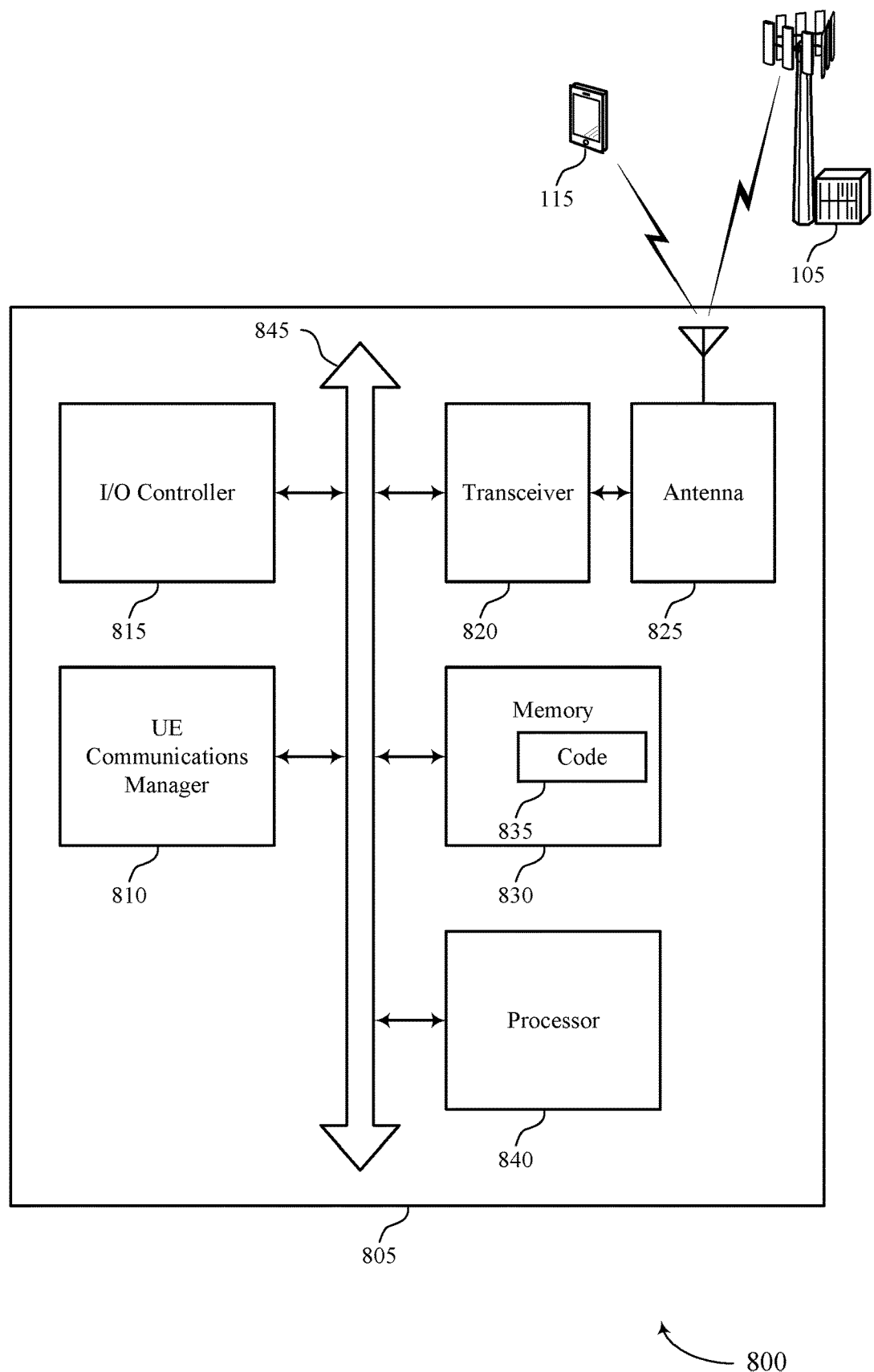
FIG. 8 shows a diagram of a system including a device that supports minimization of drive tests for dual connectivity in accordance with aspects of the present disclosure.

FIG. 8 shows a diagram of a system 800 including a device 805 that supports MDT for dual connectivity in accordance with aspects of the present disclosure. The device 805 may be an example of or include the components of device 505, device 605, or a UE 115 as described herein. The device 805 may include components for bi-directional voice and data communications including components for transmitting and receiving communications, including a UE communications manager 810, an I/O controller 815, a transceiver 820, an antenna 825, memory 830, and a processor 840. These components may be in electronic communication via one or more buses (e.g., bus 845).

The UE communications manager 810 may identify that the UE is operating in a dual-connectivity configuration with a first base station and a second base station, receive at least one request for MDT measurements, perform, based on the at least one request, a first portion of measurements associated with the first base station while the UE is operating in the dual-connectivity configuration, perform, based on the at least one request, a second portion of measurements associated with the second base station while the UE is operating in the dual-connectivity configuration, and transmit one or more reports including information indicative of the first portion of measurements, information indicative of the second portion of measurements, or both.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting MDTs for dual connectivity).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
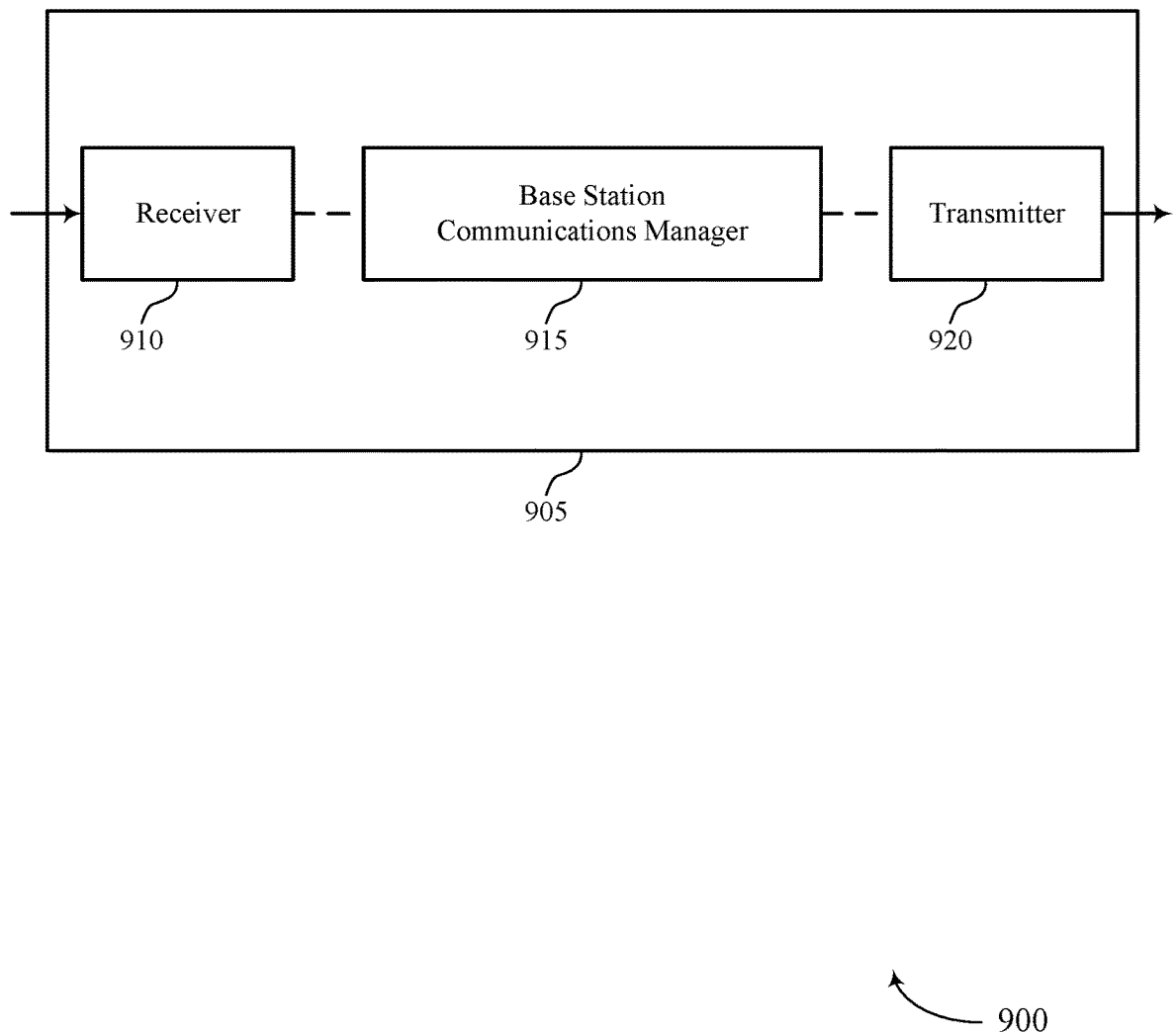
FIGS. 9 and 10 show block diagrams of devices that support minimization of drive tests for dual connectivity in accordance with aspects of the present disclosure.

FIG. 9 shows a block diagram 900 of a device 905 that supports MDTs for dual connectivity in accordance with aspects of the present disclosure. The device 905 may be an example of aspects of a base station 105 as described herein. The device 905 may include a receiver 910, a base station communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to MDT for dual connectivity, etc.). Information may be passed on to other components of the device 905. The receiver 910 may be an example of aspects of the transceiver 1220 described with reference to FIG. 12. The receiver 910 may utilize a single antenna or a set of antennas.

In some cases, the base station communications manager 915 may identify that the first base station is a master node for a UE operating in a dual-connectivity configuration, receive a first MDT trace request, transmit a second MDT trace request to a second base station operating as a secondary node for the UE, the second MDT trace request being based on the first MDT trace request, and transmit a request for one or more MDT measurements to be reported by the UE in accordance with at least the first MDT trace request.

In some cases, the base station communications manager 915 may identify that the first base station is a secondary node for a UE operating in a dual-connectivity configuration, receive, from a second base station that is a master node for the UE in the dual-connectivity configuration, an MDT trace request associated with the UE, and transmit a request for one or more MDT measurements to be reported by the UE based on receipt of the MDT trace request from the master node. The base station communications manager 915 may be an example of aspects of the base station communications manager 1210 described herein.

The base station communications manager 915, or its sub-components, may be implemented in hardware, code (e.g., software or firmware) executed by a processor, or any combination thereof. If implemented in code executed by a processor, the functions of the base station communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The base station communications manager 915, or its sub-components, may be physically located at various positions, including being distributed such that portions of functions are implemented at different physical locations by one or more physical components. In some examples, the base station communications manager 915, or its sub-components, may be a separate and distinct component in accordance with various aspects of the present disclosure. In some examples, the base station communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
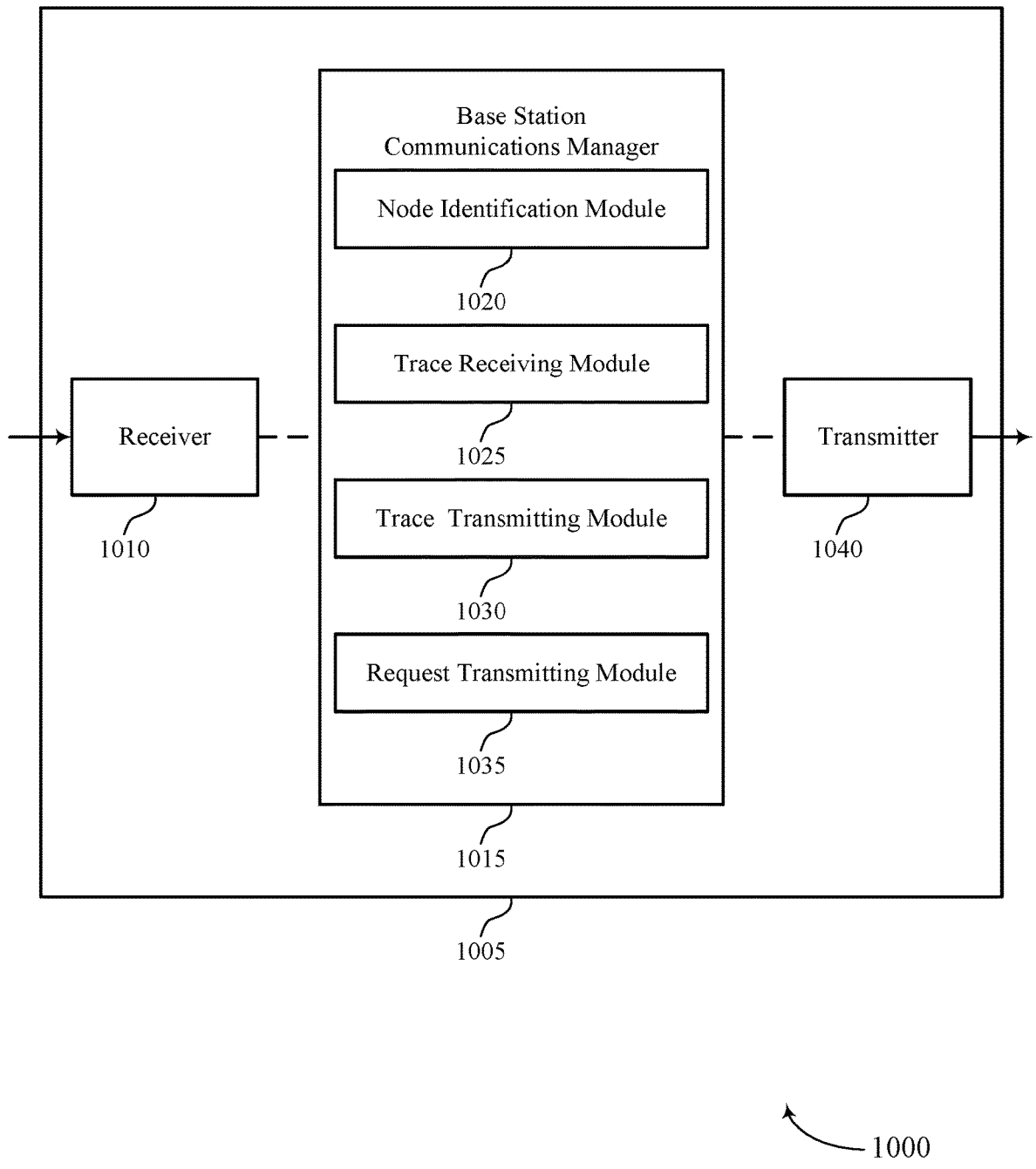

FIG. 10 shows a block diagram 1000 of a device 1005 that supports MDT for dual connectivity in accordance with aspects of the present disclosure. The device 1005 may be an example of aspects of a device 905, or a base station 105 as described herein. The device 1005 may include a receiver 1010, a base station communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to MDT for dual connectivity, etc.). Information may be passed on to other components of the device 1005. The receiver 1010 may be an example of aspects of the transceiver 1220 described with reference to FIG. 12. The receiver 1010 may utilize a single antenna or a set of antennas.

The base station communications manager 1015 may be an example of aspects of the base station communications manager 915 as described herein. The base station communications manager 1015 may include a node identification module 1020, a trace receiving module 1025, a trace transmitting module 1030, and a request transmitting module 1035. The base station communications manager 1015 may be an example of aspects of the base station communications manager 1210 described herein.

In some examples, the node identification module 1020 may identify that the first base station is a master node for a UE operating in a dual-connectivity configuration.

In some examples, the node identification module 1020 may identify that the first base station is a secondary node for a UE operating in a dual-connectivity configuration.

The trace receiving module 1025 may receive a first MDT trace request.

The trace transmitting module 1030 may transmit a second MDT trace request to a second base station operating as a secondary node for the UE, the second MDT trace request being based on the first MDT trace request.

The request transmitting module 1035 may transmit a request for one or more MDT measurements to be reported by the UE in accordance with at least the first MDT trace request.

The trace receiving module 1025 may receive, from a second base station that is a master node for the UE in the dual-connectivity configuration, an MDT trace request associated with the UE.

The request transmitting module 1035 may transmit a request for one or more MDT measurements to be reported by the UE based on receipt of the MDT trace request from the master node.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
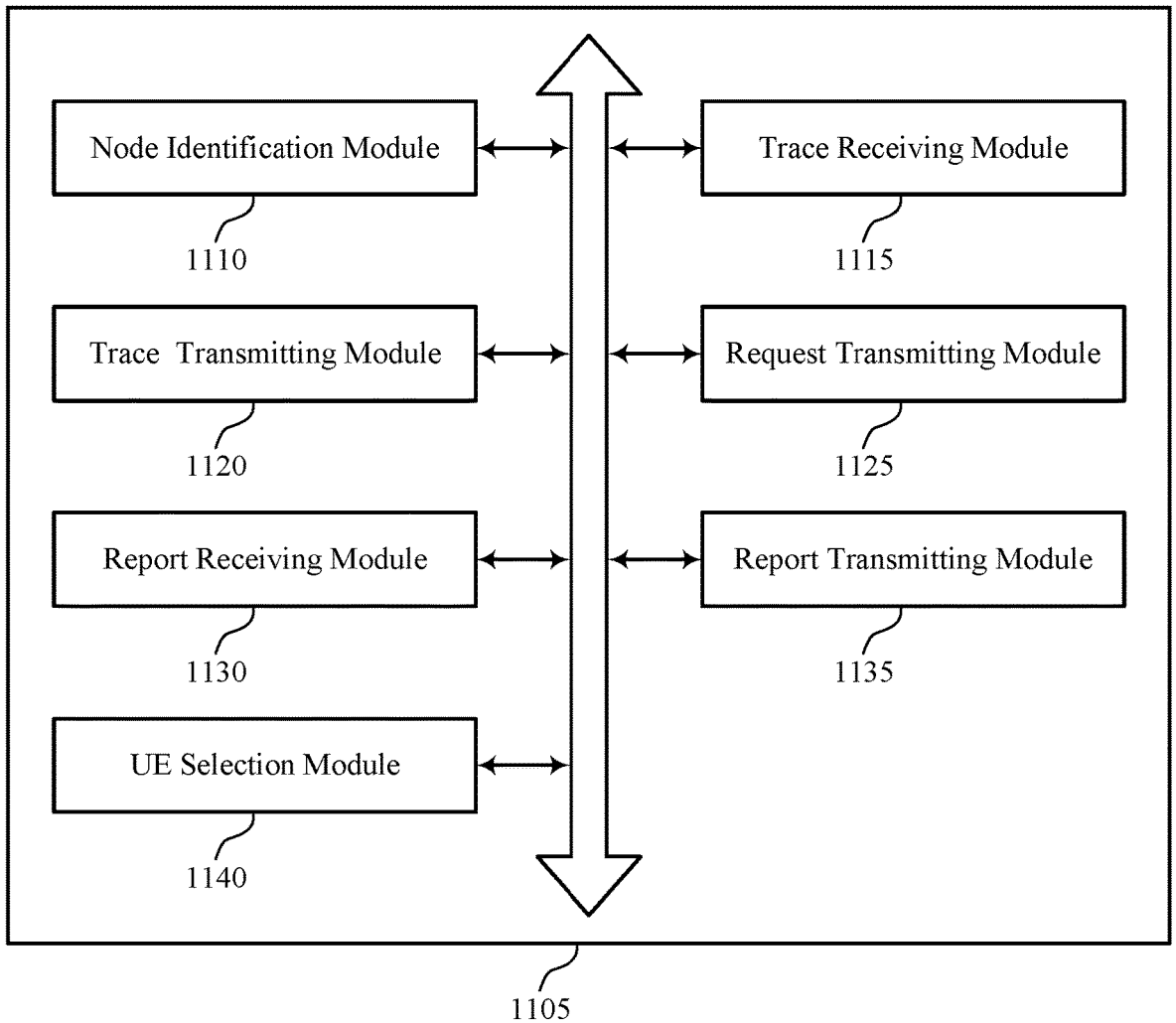
FIG. 11 shows a block diagram of a base station communications manager that supports minimization of drive tests for dual connectivity in accordance with aspects of the present disclosure.

FIG. 11 shows a block diagram 1100 of a base station communications manager 1105 that supports MDT for dual connectivity in accordance with aspects of the present disclosure. The base station communications manager 1105 may be an example of aspects of a base station communications manager 915, a base station communications manager 1015, or a base station communications manager 1210 described herein. The base station communications manager 1105 may include a node identification module 1110, a trace receiving module 1115, a trace transmitting module 1120, a request transmitting module 1125, a report receiving module 1130, a report transmitting module 1135, and an UE selection module 1140. Each of these modules may communicate, directly or indirectly, with one another (e.g., via one or more buses).

In some examples, the node identification module 1110 may identify that the first base station is a master node for a UE operating in a dual-connectivity configuration.

In some examples, the node identification module 1110 may identify that the first base station is a secondary node for a UE operating in a dual-connectivity configuration.

The trace receiving module 1115 may receive a first MDT trace request.

In some examples, the trace receiving module 1115 may receive, from a second base station that is a master node for the UE in the dual-connectivity configuration, an MDT trace request associated with the UE.

In some examples, the trace receiving module 1115 may receive, from the second base station, a second measurement configuration associated with performing the one or more measurements on the second base station, where transmitting the request for one or more measurements includes transmitting the second measurement configuration to the UE.

In some cases, the first MDT trace request includes an indication of the UE. In some cases, the second MDT trace request includes an indication of the UE.

The trace transmitting module 1120 may transmit a second MDT trace request to a second base station operating as a secondary node for the UE, the second MDT trace request being based on the first MDT trace request.

The request transmitting module 1125 may transmit a request for one or more MDT measurements to be reported by the UE in accordance with at least the first MDT trace request.

In some cases, the MDT measurements include quality of service measurements, quality of experience measurements, measurements of a split radio bearer associated with the first base station or the second base station, flow-level throughput measurements performed at the SDAP layer, and/or DRB level throughput measurements performed at the PDCP layer.

In some examples, the request transmitting module 1125 may transmit a request for one or more MDT measurements to be reported by the UE based on receipt of the MDT trace request from the master node.

In some examples, the request transmitting module 1125 may transmit a first measurement configuration to the UE, the first measurement configuration associated with performing the one or more measurements on the first base station.

In some examples, the request transmitting module 1125 may transmit a measurement configuration to the second base station, the measurement configuration associated with performing the one or more MDT measurements on the first base station.

In some examples, the request transmitting module 1125 may transmit a measurement configuration to the UE, the measurement configuration associated with performing the one or more MDT measurements on the first base station.

In some cases, the measurement configuration is transmitted to the UE via RRC signaling.

The report receiving module 1130 may receive, from the UE, a first report including information indicative of the one or more measurements performed on the first base station by the UE.

In some examples, the report receiving module 1130 may receive, from the second base station, a second report including information indicative of the one or more measurements performed on the second base station.

In some examples, the report receiving module 1130 may receive, from the UE, a report including information indicative of the one or more MDT measurements performed by the UE.

The report transmitting module 1135 may transmit a report that includes at least a portion of the information indicative of the one or more measurements performed on the first base station to a network entity. In some cases, the report includes an indication of the first base station and/or a cell identifier associated with the first base station.

In some examples, the report transmitting module 1135 may combine the information indicative of the one or more measurements performed on the first base station with the information indicative of the one or more measurements performed on the second base station to generate information indicative of one or more overall measurements.

In some examples, the report transmitting module 1135 may transmit a report that includes the information indicative of the one or more overall measurements to a network entity. In some cases, the report may include an indication of the first base station, an indication of the second base station, a cell identifier associated with the first base station, and/or a cell identifier associated with the second base station.

In some examples, the report transmitting module 1135 may transmit a second report to the second base station, the second report based on the report including the information indicative of the one or more MDT measurements.

In some examples, the report transmitting module 1135 may transmit a second report to a network entity, the second report based on the report including the information indicative of the one or more MDT measurements. In some cases, the second report includes an indication of the first base station and/or a cell identifier associated with the first base station.

The UE selection module 1140 may select the UE from a set of UEs based on one or more of a user consent associated with the UE, a capability of the UE, an area associated with the UE, and a public land mobile network (PLMN) list associated with the UE. In some cases, the user consent associated with the UE includes a common user consent for two or more of a single-connectivity configuration, the dual-connectivity configuration, a first RAN associated with the first base station, and a second RAN associated with the second base station. In some cases, the capability of the UE includes a capability to perform MDT measurements while operating in the dual-connectivity configuration or a capability to perform concurrent MDT measurements on the master node and the secondary node while operating in the dual-connectivity configuration. In some cases, the capability of the UE is specified in one or more configuration fields of an information element.

Figure 12:
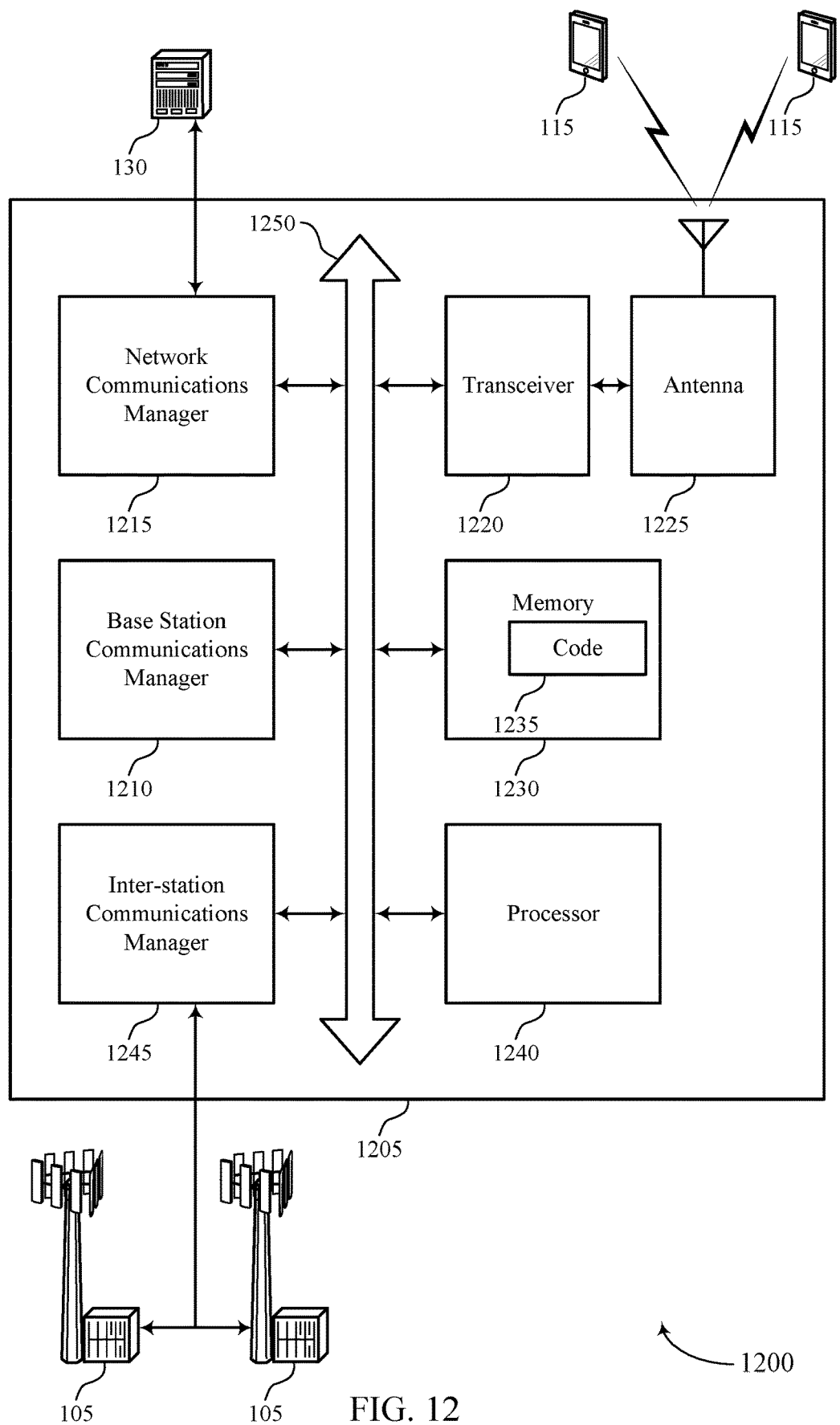
FIG. 12 shows a diagram of a system including a device that supports minimization of drive tests for dual connectivity in accordance with aspects of the present disclosure.

FIG. 12 shows a diagram of a system 1200 including a device 1205 that supports MDT for dual connectivity in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a base station communications manager 1210, a network base station communications manager 1215, a transceiver 1220, an antenna 1225, memory 1230, a processor 1240, and an inter-station base station communications manager 1245. These components may be in electronic communication via one or more buses (e.g., bus 1250).

The base station communications manager 1210 may identify that the first base station is a master node for a UE operating in a dual-connectivity configuration, receive a first MDT trace request, transmit a second MDT trace request to a second base station operating as a secondary node for the UE, the second MDT trace request being based on the first MDT trace request, and transmit a request for one or more MDT measurements to be reported by the UE in accordance with at least the first MDT trace request. The base station communications manager 1210 may also identify that the first base station is a secondary node for a UE operating in a dual-connectivity configuration, receive, from a second base station that is a master node for the UE in the dual-connectivity configuration, an MDT trace request associated with the UE, and transmit a request for one or more MDT measurements to be reported by the UE based on receipt of the MDT trace request from the master node.

The network base station communications manager 1215 may manage communications with the core network (e.g., via one or more wired backhaul links). For example, the network base station communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting MDT for dual connectivity).

The inter-station base station communications manager 1245 may manage communications with other base stations 105, and may include a controller or scheduler for controlling communications with UEs 115 in cooperation with other base stations 105. For example, the inter-station base station communications manager 1245 may coordinate scheduling for transmissions to UEs 115 for various interference mitigation techniques such as beamforming or joint transmission. In some examples, the inter-station base station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
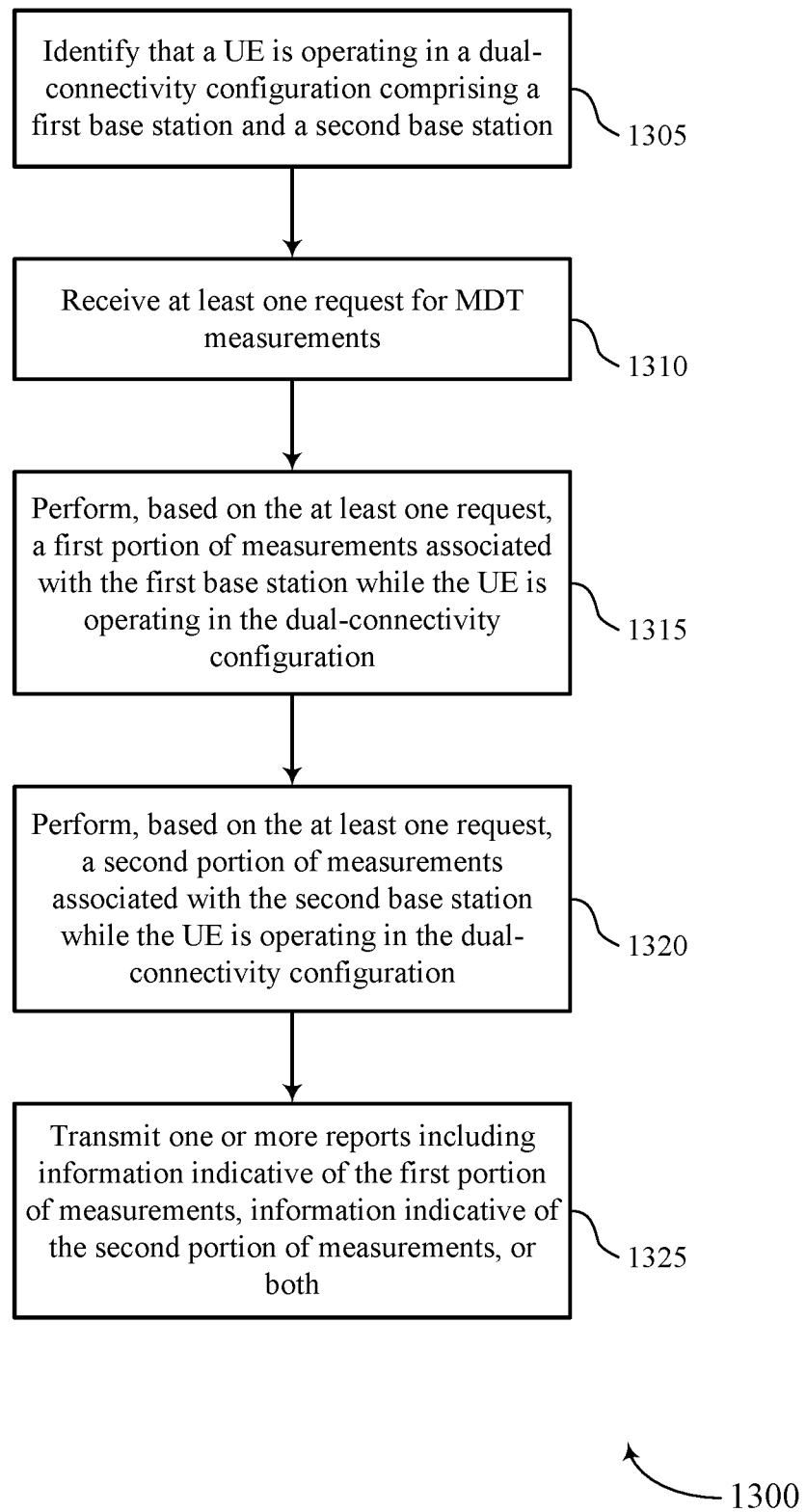
FIGS. 13 through 15 show flowcharts illustrating methods that support minimization of drive tests for dual connectivity in accordance with aspects of the present disclosure.

FIG. 13 shows a flowchart illustrating a method 1300 that supports MDT for dual connectivity in accordance with aspects of the present disclosure. The operations of method 1300 may be implemented by a UE 115 or its components as described herein. For example, the operations of method 1300 may be performed by a UE communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may identify that the UE is operating in a dual-connectivity configuration with a first base station and a second base station. The operations of 1305 may be performed according to the methods described herein. In some examples, aspects of the operations of 1305 may be performed by a dual-connectivity module as described with reference to FIGS. 5 through 8.

At 1310, the UE may receive at least one request for MDT measurements. The operations of 1310 may be performed according to the methods described herein. In some examples, aspects of the operations of 1310 may be performed by a request receiving module as described with reference to FIGS. 5 through 8.

At 1315, the UE may perform, based on the at least one request, a first portion of measurements associated with the first base station while the UE is operating in the dual-connectivity configuration. The operations of 1315 may be performed according to the methods described herein. In some examples, aspects of the operations of 1315 may be performed by a measurement module as described with reference to FIGS. 5 through 8.

At 1320, the UE may perform, based on the at least one request, a second portion of measurements associated with the second base station while the UE is operating in the dual-connectivity configuration. The operations of 1320 may be performed according to the methods described herein. In some examples, aspects of the operations of 1320 may be performed by a measurement module as described with reference to FIGS. 5 through 8.

At 1325, the UE may transmit one or more reports including information indicative of the first portion of measurements, information indicative of the second portion of measurements, or both. The operations of 1325 may be performed according to the methods described herein. In some examples, aspects of the operations of 1325 may be performed by a report transmitting module as described with reference to FIGS. 5 through 8.

Figure 14:
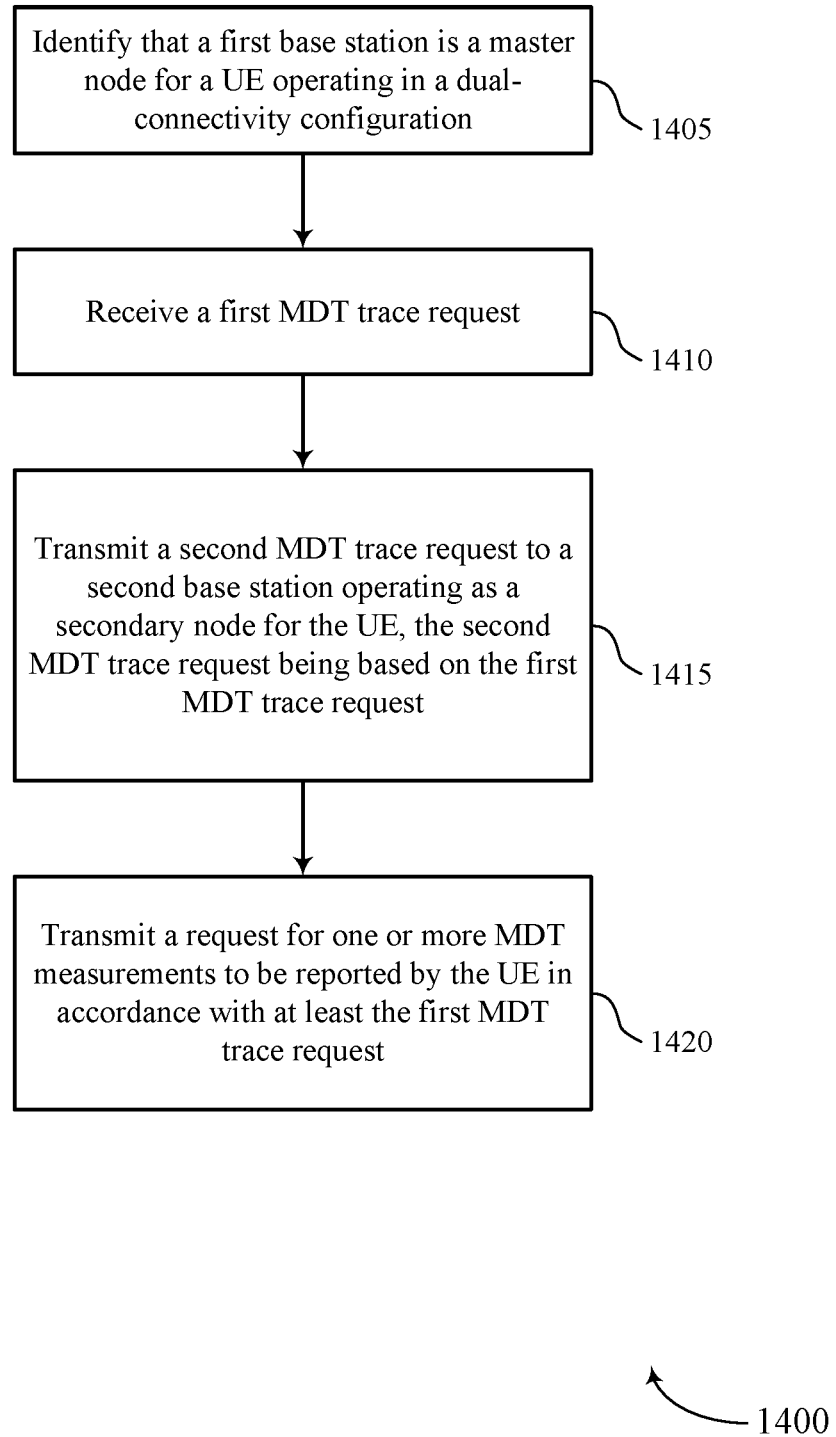

FIG. 14 shows a flowchart illustrating a method 1400 that supports MDT for dual connectivity in accordance with aspects of the present disclosure. The operations of method 1400 may be implemented by a base station 105 or its components as described herein. For example, the operations of method 1400 may be performed by a base station communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1405, the base station may identify that the first base station is a master node for a UE operating in a dual-connectivity configuration. The operations of 1405 may be performed according to the methods described herein. In some examples, aspects of the operations of 1405 may be performed by a node identification module as described with reference to FIGS. 9 through 12.

At 1410, the base station may receive a first MDT trace request. The operations of 1410 may be performed according to the methods described herein. In some examples, aspects of the operations of 1410 may be performed by a trace receiving module as described with reference to FIGS. 9 through 12.

At 1415, the base station may transmit a second MDT trace request to a second base station operating as a secondary node for the UE, the second MDT trace request being based on the first MDT trace request. The operations of 1415 may be performed according to the methods described herein. In some examples, aspects of the operations of 1415 may be performed by a trace transmitting module as described with reference to FIGS. 9 through 12.

At 1420, the base station may transmit a request for one or more MDT measurements to be reported by the UE in accordance with at least the first MDT trace request. The operations of 1420 may be performed according to the methods described herein. In some examples, aspects of the operations of 1420 may be performed by a request transmitting module as described with reference to FIGS. 9 through 12.

Figure 15:
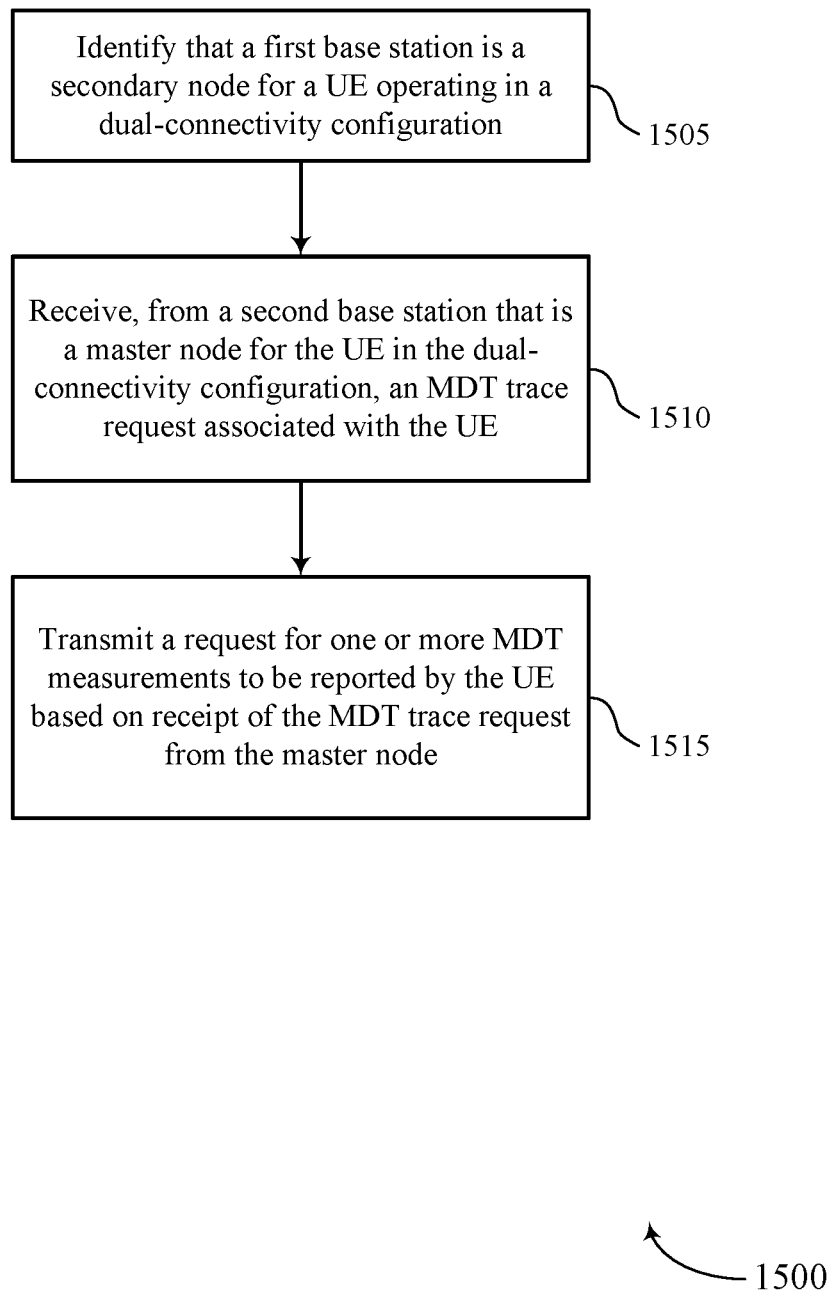

FIG. 15 shows a flowchart illustrating a method 1500 that supports MDT for dual connectivity in accordance with aspects of the present disclosure. The operations of method 1500 may be implemented by a base station 105 or its components as described herein. For example, the operations of method 1500 may be performed by a base station communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1505, the base station may identify that the first base station is a secondary node for a UE operating in a dual-connectivity configuration. The operations of 1505 may be performed according to the methods described herein. In some examples, aspects of the operations of 1505 may be performed by a node identification module as described with reference to FIGS. 9 through 12.

At 1510, the base station may receive, from a second base station that is a master node for the UE in the dual-connectivity configuration, an MDT trace request associated with the UE. The operations of 1510 may be performed according to the methods described herein. In some examples, aspects of the operations of 1510 may be performed by a trace receiving module as described with reference to FIGS. 9 through 12.

At 1515, the base station may transmit a request for one or more MDT measurements to be reported by the UE based on receipt of the MDT trace request from the master node. The operations of 1515 may be performed according to the methods described herein. In some examples, aspects of the operations of 1515 may be performed by a request transmitting module as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed portion of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description portion forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
identifying that the UE is operating in a dual-connectivity configuration comprising a first network entity and a second network entity;
receiving at least one request for minimization of drive test (MDT) measurements while the UE is operating in accordance with the dual-connectivity configuration;
performing, based at least in part on the at least one request, a first portion of measurements associated with the first network entity;
performing, based at least in part on the at least one request, a second portion of measurements associated with the second network entity, wherein at least one of the first portion of measurements and the second portion of measurements comprise logged measurements that the UE performs while operating in a radio resource control (RRC) inactive mode; and
transmitting one or more reports including information indicative of the first portion of measurements, information indicative of the second portion of measurements, or both, wherein transmitting the one or more reports comprises:
transmitting, to the first network entity, a first report that includes information indicative of the first portion of measurements, the second portion of measurements, or both.

2. The method of claim 1, wherein transmitting the one or more reports comprises:
transmitting, to the first network entity, the first report including information indicative of the first portion of measurements; and
transmitting, to the second network entity, a second report including information indicative of the second portion of measurements.

3. The method of claim 1, wherein receiving the at least one request for MDT measurements comprises:
receiving, from the first network entity, a first measurement configuration for the first portion of measurements; and
receiving, from the second network entity, a second measurement configuration for the second portion of measurements.

4. The method of claim 3, wherein receiving the second measurement configuration comprises:
receiving the second measurement configuration from the second network entity via direct signaling radio bearer SRB3.

5. The method of claim 1, wherein receiving the at least one request for MDT measurements comprises:
receiving, from the first network entity, a first measurement configuration for the first portion of measurements and a second measurement configuration for the second portion of measurements.

6. The method of claim 5, wherein the first network entity is a master node in the dual-connectivity configuration and the second network entity is a secondary node in the dual-connectivity configuration.

7. The method of claim 1, wherein the first portion of measurements are performed concurrently with the second portion of measurements.

8. The method of claim 1, further comprising:
storing results of at least one of the first portion of measurements and the second portion of measurements; and
entering an RRC connected mode after storing the results of at least one of the first portion of measurements and the second portion of measurements, wherein the UE transmits the one or more reports while in the RRC connected mode.

9. The method of claim 1, wherein the MDT measurements comprise one or more quality of service measurements or quality of experience measurements.

10. The method of claim 1, wherein the MDT measurements comprise one or more measurements of a split radio bearer associated with the first network entity or the second network entity.

11. The method of claim 1, wherein the MDT measurements comprise flow-level throughput measurements performed at a service data adaptation protocol (SDAP) layer or data radio bearer (DRB) level throughput measurements performed at a packet data convergence protocol (PDCP) layer.

12. A method for wireless communications at a first network entity, comprising:
identifying that the first network entity is a master node for a user equipment (UE) operating in a dual-connectivity configuration;
receiving a first minimization of drive test (MDT) trace request;
transmitting a second MDT trace request to a second network entity operating as a secondary node for the UE, the second MDT trace request being based on the first MDT trace request; and
transmitting a request for one or more MDT measurements to be reported by the UE in accordance with at least the first MDT trace request.

13. The method of claim 12, wherein transmitting the request comprises:
transmitting a first measurement configuration to the UE, the first measurement configuration associated with performing the one or more MDT measurements on the first network entity.

14. The method of claim 13, further comprising:
receiving, from the second network entity, a second measurement configuration associated with performing the one or more MDT measurements on the second network entity, wherein transmitting the request for the one or more MDT measurements comprises transmitting the second measurement configuration to the UE.

15. The method of claim 12, further comprising:
receiving, from the UE, a first report comprising information indicative of the one or more MDT measurements performed on the first network entity by the UE.

16. The method of claim 15, further comprising:
transmitting a second report comprising at least a portion of the information indicative of the one or more MDT measurements performed on the first network entity to a third network entity.

17. The method of claim 16, wherein the second report comprises one or more of an indication of the first network entity and a cell identifier associated with the first network entity.

18. The method of claim 12, wherein the second MDT trace request comprises an indication of the UE.

19. The method of claim 18, further comprising:

receiving, from the second network entity, a second report comprising information indicative of the one or more MDT measurements performed on the second network entity.

20. The method of claim 19, further comprising:

combining the information indicative of the one or more MDT measurements performed on the first network entity with the information indicative of the one or more MDT measurements performed on the second network entity to generate information indicative of one or more overall measurements; and transmitting a third report comprising the information indicative of the one or more overall measurements to a network entity.

21. The method of claim 20, wherein the third report comprises one or more of an indication of the first network entity, an indication of the second base station network entity, a cell identifier associated with the first network entity, and a cell identifier associated with the second network entity.

22. The method of claim 12, wherein the first MDT trace request comprises an indication of the UE.

23. The method of claim 12, further comprising:

selecting the UE from a plurality of UEs based at least in part on one or more of a user consent associated with the UE, a capability of the UE, an area associated with the UE, and a public land mobile network (PLMN) list associated with the UE.

24. The method of claim 23, wherein the user consent associated with the UE comprises a common user consent for two or more of a single- connectivity configuration, the dual-connectivity configuration, a first RAN associated with the first network entity, and a second RAN associated with the second network entity.

25. The method of claim 23, wherein the capability of the UE comprises a capability to perform MDT measurements while operating in the dual-connectivity configuration or a capability to perform concurrent MDT measurements on the master node and the secondary node while operating in the dual-connectivity configuration.

26. The method of claim 12, wherein the one or more MDT measurements comprise one or more of quality of service measurements, quality of experience measurements, measurements of a split radio bearer associated with the first network entity or the second network entity, flow-level throughput measurements performed at a service data adaptation protocol (SDAP) layer, or data radio bearer (DRB) level throughput measurements performed at a packet data convergence protocol (PDCP) layer.

27. An apparatus for wireless communications, comprising:

one or more processors,
one or more memories coupled with the one or more processors; and
instructions stored in the one or more memories and executable by the one or more processors to cause the apparatus to:
identify that a user equipment (UE) is operating in a dual-connectivity configuration comprising a first network entity and a second network entity;
receive at least one request for minimization of drive test (MDT) measurements while the UE is operating in accordance with the dual-connectivity configuration;
perform, based at least in part on the at least one request, a first portion of measurements associated with the first network entity;
perform, based at least in part on the at least one request, a second portion of measurements associated with the second network entity, wherein at least one of the first portion of measurements and the second portion of measurements comprise logged measurements that the UE performs while operating in a radio resource control (RRC) inactive mode; and
transmit one or more reports including information indicative of the first portion of measurements, information indicative of the second portion of measurements, or both,
wherein the instructions are further executable by the one or more processors to cause the apparatus to transmit, to the first network entity, a first report that includes information indicative of both the first portion of measurements and the second portion of measurements.

28. An apparatus for wireless communications, comprising:

one or more processors,
one or more memories coupled with the one or more processors; and
instructions stored in the one or more memories and executable by the one or more processors to cause the apparatus to:
identify that a first network entity is a master node for a user equipment (UE) operating in a dual-connectivity configuration;
receive a first minimization of drive test (MDT) trace request;
transmit a second MDT trace request to a second network entity operating as a secondary node for the UE, the second MDT trace request being based on the first MDT trace request; and
transmit a request for one or more MDT measurements to be reported by the UE in accordance with at least the first MDT trace request.

\* \* \* \* \*